US012639231B2

(12) United States Patent
Aggarwal et al.

(10) Patent No.: US 12,639,231 B2
(45) Date of Patent: May 26, 2026

(54) MULTI-LEVEL CACHE DATA TRACKING AND ISOLATION

(71) Applicant: Intel Corporation, Santa Clara, CA (US)

(72) Inventors: Aneesh Aggarwal, Portland, OR (US); Georgii Tkachuk, Phoenix, AZ (US); Subhiksha Ravisundar, Gilbert, AZ (US); Youngsoo Choi, Alameda, CA (US); Niall McDonnell, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/954,232

(22) Filed: Sep. 27, 2022

(65) Prior Publication Data

US 2024/0104022 A1     Mar. 28, 2024

(51) Int. Cl.
*G06F 12/00*     (2006.01)
*G06F 12/06*     (2006.01)
*G06F 12/0897*     (2016.01)

(52) U.S. Cl.
CPC ........ *G06F 12/0897* (2013.01); *G06F 12/063* (2013.01)

(58) Field of Classification Search
CPC ............... G06F 12/0897; G06F 12/063; G06F 2212/1008; G06F 2212/1024; G06F 2212/502; G06F 2212/601; G06F 12/0848; G06F 12/0864; G06F 12/0888; G06F 12/126; G06F 12/0811
See application file for complete search history.

(56) References Cited

U.S. PATENT DOCUMENTS

| | | | |
|---|---|---|---|
| 11,188,475 B1 * | 11/2021 | Pusdesris | ............ G06F 12/0897 |
| 2018/0203802 A1 * | 7/2018 | Alves | .................. G06F 12/0862 |
| 2019/0042388 A1 * | 2/2019 | Wang | ................... G06F 12/084 |
| 2019/0042416 A1 * | 2/2019 | Doshi | ................. G06F 12/0804 |
| 2019/0044828 A1 | 2/2019 | Gasparakis et al. | |
| 2021/0056043 A1 * | 2/2021 | Grisenthwaite | ..... G06F 12/0897 |

* cited by examiner

*Primary Examiner* — Arvind Talukdar
(74) *Attorney, Agent, or Firm* — Essential Patents Group, LLP

(57)     ABSTRACT

An example of an apparatus may include a first cache organized as two or more portions, a second cache, and circuitry coupled to the first cache and the second cache to determine a designated portion allocation for data transferred from the first cache to the second cache, and track the designated portion allocation for the data transferred from the first cache to the second cache. Other examples are disclosed and claimed.

17 Claims, 21 Drawing Sheets

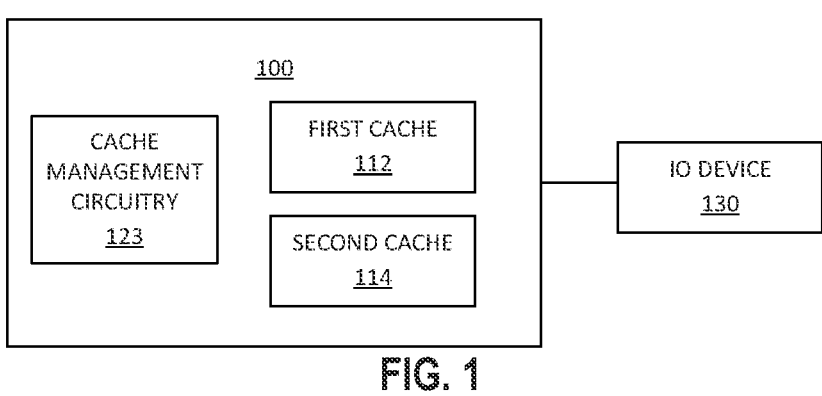

DETERMINE A DESIGNATED PORTION ALLOCATION FOR DATA TRANSFERRED FROM A FIRST CACHE TO A SECOND CACHE 231

TRACK THE DESIGNATED PORTION ALLOCATION FOR THE DATA TRANSFERRED FROM THE FIRST CACHE TO THE SECOND CACHE 233

SEPARATE IO DATA FROM NON-IO DATA BASED AT LEAST IN PART ON THE TRACKED DESIGNATED PORTION ALLOCATION 234

2B

2C

ISOLATE IO DATA FROM NON-IO DATA FOR DATA TRANSFERRED FROM THE SECOND CACHE TO THE FIRST CACHE BASED AT LEAST IN PART ON THE TRACKED DESIGNATED PORTION ALLOCATION 235

DETERMINE THE DESIGNATED PORTION ALLOCATION BASED ON WHETHER THE DATA TRANSFERRED FROM THE FIRST CACHE TO THE SECOND CACHE COMES FROM ONE OR MORE PORTIONS OF THE FIRST CACHE THAT ARE DESIGNATED TO BE ALLOCATED FOR IO DATA 237

EVICT DATA FROM THE SECOND CACHE TO THE FIRST CACHE TO ONE OR MORE PORTIONS OF THE FIRST CACHE INDICATED BY THE TRACKED DESIGNATED PORTION ALLOCATION FOR THE EVICTED DATA 239

FIG. 2A

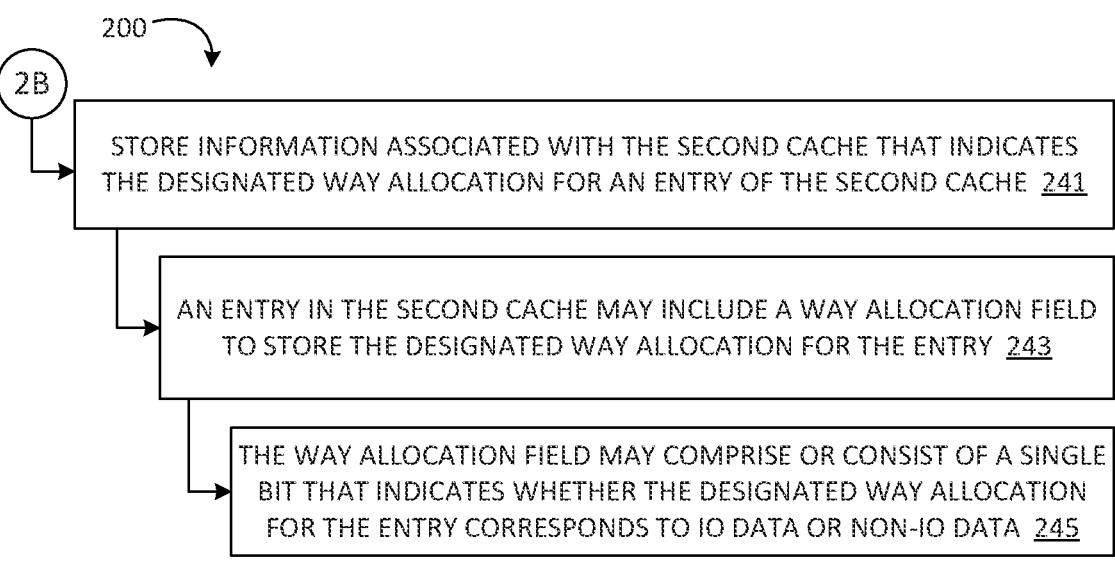

200

2B

STORE INFORMATION ASSOCIATED WITH THE SECOND CACHE THAT INDICATES THE DESIGNATED WAY ALLOCATION FOR AN ENTRY OF THE SECOND CACHE 241

AN ENTRY IN THE SECOND CACHE MAY INCLUDE A WAY ALLOCATION FIELD TO STORE THE DESIGNATED WAY ALLOCATION FOR THE ENTRY 243

THE WAY ALLOCATION FIELD MAY COMPRISE OR CONSIST OF A SINGLE BIT THAT INDICATES WHETHER THE DESIGNATED WAY ALLOCATION FOR THE ENTRY CORRESPONDS TO IO DATA OR NON-IO DATA 245

FIG. 2B

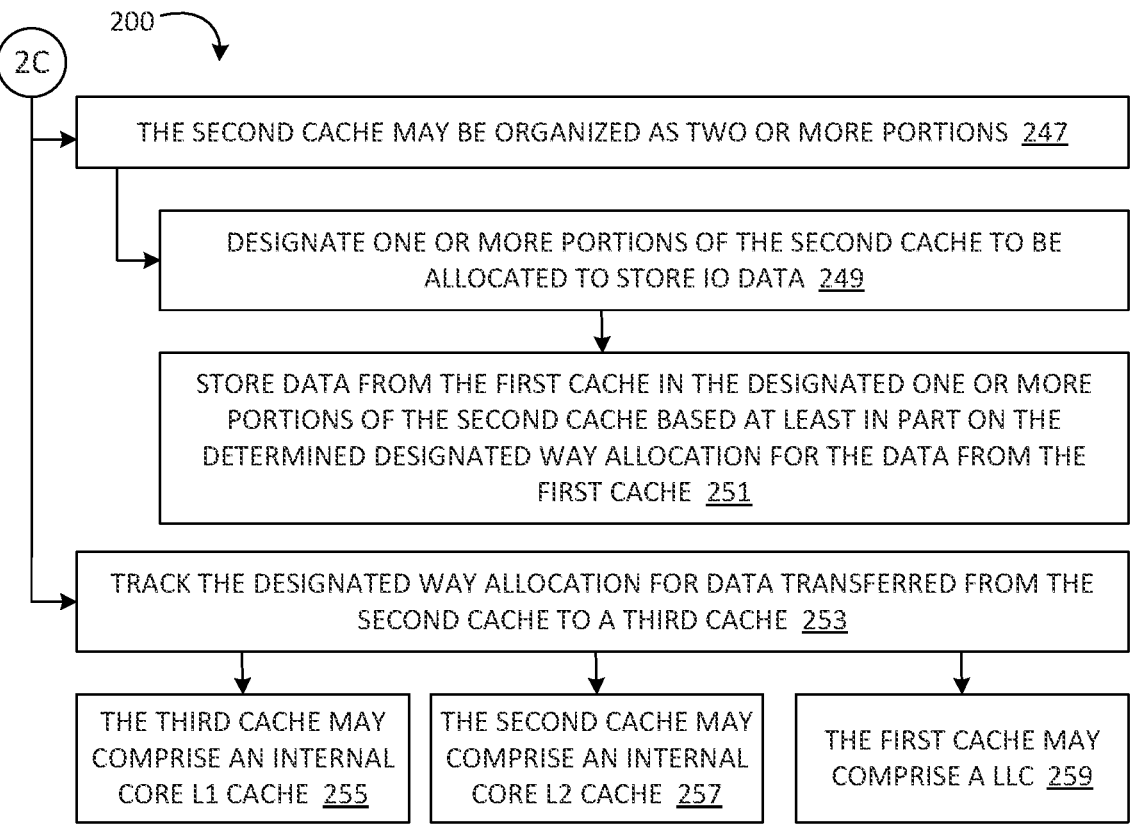

200

2C

THE SECOND CACHE MAY BE ORGANIZED AS TWO OR MORE PORTIONS 247

DESIGNATE ONE OR MORE PORTIONS OF THE SECOND CACHE TO BE ALLOCATED TO STORE IO DATA 249

STORE DATA FROM THE FIRST CACHE IN THE DESIGNATED ONE OR MORE PORTIONS OF THE SECOND CACHE BASED AT LEAST IN PART ON THE DETERMINED DESIGNATED WAY ALLOCATION FOR THE DATA FROM THE FIRST CACHE 251

TRACK THE DESIGNATED WAY ALLOCATION FOR DATA TRANSFERRED FROM THE SECOND CACHE TO A THIRD CACHE 253

THE THIRD CACHE MAY COMPRISE AN INTERNAL CORE L1 CACHE 255

THE SECOND CACHE MAY COMPRISE AN INTERNAL CORE L2 CACHE 257

THE FIRST CACHE MAY COMPRISE A LLC 259

FIG. 2C

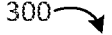
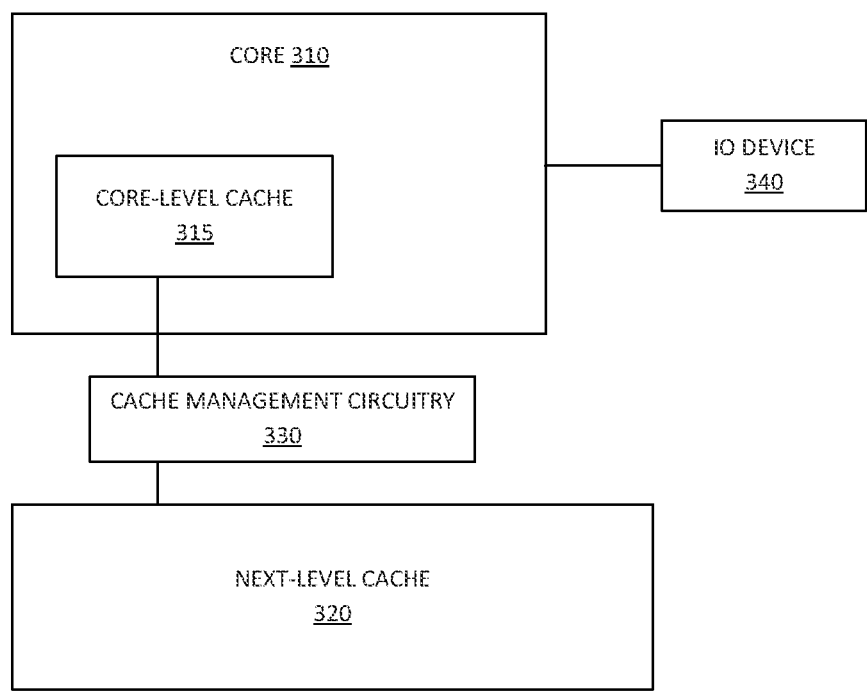
FIG. 3

CACHE 414

CACHE CONTROLLER 502

MDTI MODULE 508

COHERENT FABRIC CONTROL 504

COHERENT FABRIC DATA 506

REQ 510

RSP 512

SIDEBAND 514

THROTTLE 526

WRITES 516

412

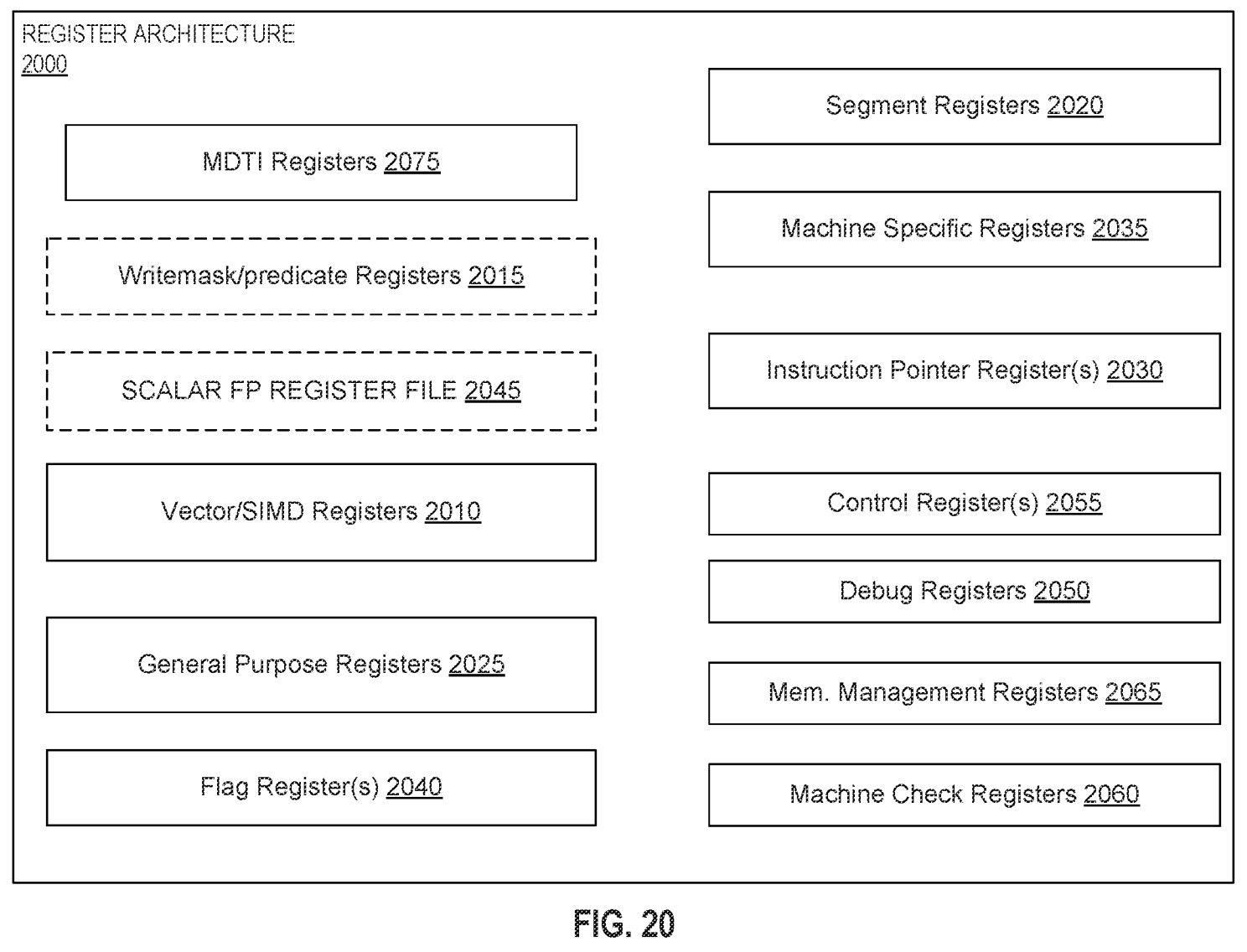

REGISTER ARCHITECTURE
2000

MDTI Registers 2075

Writemask/predicate Registers 2015

SCALAR FP REGISTER FILE 2045

Vector/SIMD Registers 2010

General Purpose Registers 2025

Flag Register(s) 2040

Segment Registers 2020

Machine Specific Registers 2035

Instruction Pointer Register(s) 2030

Control Register(s) 2055

Debug Registers 2050

Mem. Management Registers 2065

Machine Check Registers 2060

FIG. 20

MULTI-LEVEL CACHE DATA TRACKING AND ISOLATION

BACKGROUND

INTEL® Resource Director Technology (RDT) provides a framework with several component features for cache and memory monitoring and allocation capabilities, including Cache Monitoring Technology (CMT), Cache Allocation Technology (CAT), and Code and Data Prioritization (CDP). These technologies enable tracking and control of shared resources, such as the Last Level Cache (LLC) and main memory bandwidth, in use by many applications, containers or VMs running on the platform concurrently. RDT may aid "noisy neighbor" detection and help to reduce performance interference, ensuring the performance of key workloads in complex environments. Software-guided redistribution of cache capacity is enabled by CAT, enabling important data center VMs, containers or applications to benefit from improved cache capacity and reduced cache contention. As a specialized extension of CAT, CDP enables separate control over code and data placement in the LLC.

There is an ongoing need for improved computational devices to enable ever increasing demand for modeling complex systems, providing reduced computation times, and other considerations. In particular, there is an ongoing desire to improve caches that are included in or otherwise support operation of integrated circuits. It is with respect to these and other considerations that the present improvements have been needed. Such improvements may become critical as the desire to improve computational efficiency become even more widespread.

BRIEF DESCRIPTION OF DRAWINGS

Various examples in accordance with the present disclosure will be described with reference to the drawings, in which:

FIG. 1 is a block diagram of an example of an integrated circuit in one implementation.

FIGS. 2A to 2C are illustrative diagrams of an example of a method in one implementation.

FIG. 3 is a block diagram of an example of an apparatus in one implementation.

FIG. 20 is a block diagram of a register architecture according to some examples.

DETAILED DESCRIPTION

Figures 4, 5:
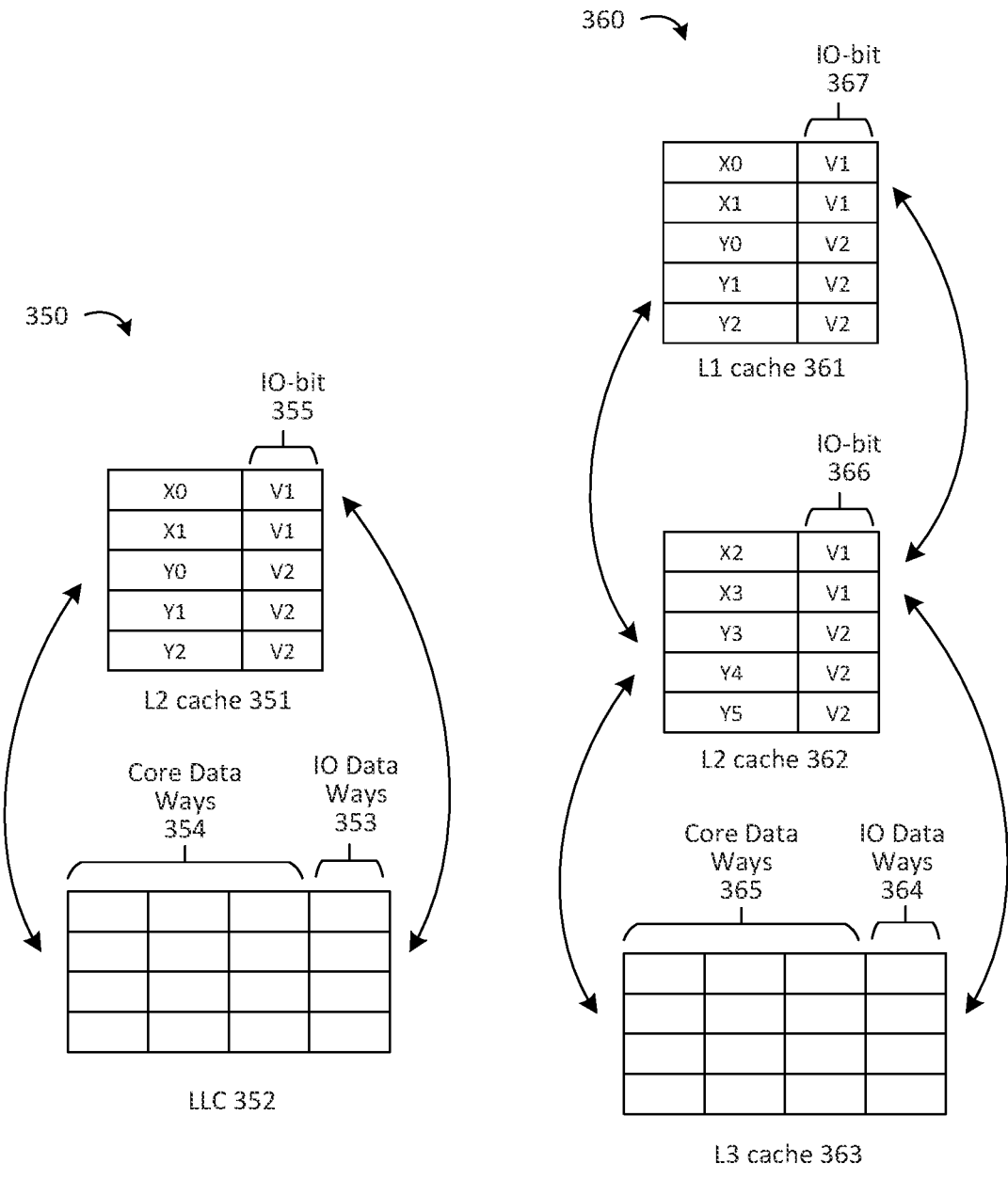
FIG. 4 is a block diagram of another example of a computer system that includes multi-level cache data tracking and isolation technology in one implementation.
FIG. 5 is a block diagram of another example of a computer system that includes multi-level cache data tracking and isolation technology in one implementation.

The present disclosure relates to methods, apparatus, systems, and non-transitory computer-readable storage media for multi-level cache data tracking and isolation. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to track and isolate data for a multi-level cache.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—e.g. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In many applications, both core and input/output (IO) are producers as well as consumers of data. For example, an ethernet packet received over the IO may be processed by the core with the resulting data transmitted out via the IO subsystem. Some computer systems may utilize direct to hardware IO technology (e.g., such as INTEL® Data Direct IO (DDIO) technology) to facilitate the core and IO interaction. With direct to hardware IO, the IO packets are written in a cache, which is then consumed by the core and the output of the cores is read from the cache to be transmitted out. Implementations of direct to hardware IO technology may benefit the system by reducing the memory bandwidth and the access latency for the data shared between the core and the IO.

However, a problem is that the core and IO interaction may result in significant interference between the core data and IO data in a higher level cache (e.g., the LLC) and in significant performance impact. For example, core data written back into the higher level cache can evict IO data that has not yet been transmitted out. The evicted cache lines then need to be read from the memory when the packet is transmitted, resulting in additional memory read bandwidth and latency for IO read. On the other hand, when a new packet is received and it misses in the higher level cache, then the new packet is placed in the higher level cache, which can evict core data resulting in bandwidth and latency for core reads.

Some computer systems may provide technology to allocate cache ways at the higher level cache to isolate direct to hardware IO data. For example, INTEL® Resource Director Technology (RDT) refers to a set of technologies including Cache Allocation Technology (CAT), Cache Monitoring Technology (CMT), and Code and Data Prioritization (CDP). In some systems cache allocation techniques may allocate specific ways of the LLC to direct to hardware IO to allocate the rest of the ways to other IO. A problem is that that only IO data that is not processed by core(s) remains isolated. If IO data is processed by one or more cores, the cores read that IO data into the internal core-level cache(s) and when that data is evicted out, the IO data is not differentiable from the core data. This problem may result in significant interference between core data and IO data and in performance impact from the interference.

Some examples described herein overcome one or more of the foregoing problems. Some examples provide multi-level cache data tracking and isolation (MDTI) technology. Some examples of MDTI technology track core and IO data in the entire end-to-end flow. Some examples of MDTI technology isolate core and IO data to reduce cache interference. Some examples of MDTI technology track and isolate the core and IO data in the entire end-to-end flow. In some implementations, the IO data is tracked as it flows through the system and cache allocation techniques are utilized to isolate the core data and IO data in the LLC. Advantageously, some embodiments provide improvements in the functioning of a computer. For example, some implementations may result in a significant drop in memory bandwidth requirements and improvement in performance for workloads that process IO. A drop in memory bandwidth requirements provided by some implementations may also reduce the memory total cost of ownership (TCO) for cases where additional memory channels are deployed primarily to support a high memory bandwidth requirement. Furthermore, some implementations may be programmable, and the settings may be adjusted (e.g., using BIOS options) to match an IO traffic pattern.

With reference to FIG. 1, an example of an integrated circuit 100 may include a first cache 112 organized as two or more portions (e.g., ways), a second cache 114, and circuitry 123 (e.g., cache management circuitry) coupled to the first cache 112 and the second cache 114 to determine a designated portion allocation for data transferred from the first cache 112 to the second cache 114, track the designated portion allocation for the data transferred from the first cache 112 to the second cache 114, and separate IO data (e.g., from IO device 130) from core data based at least in part on the tracked designated portion allocation. For example, both core data and IO device data may be written to the same caches (e.g., the first cache 112 and/or the second cache 114), and the circuitry 123 may track the data through the system and separate IO data from core data. In some implementations, the circuitry 123 may be further configured to isolate IO data from non-IO data (e.g. core data) for data transferred from the second cache 114 to the first cache 112 based at least in part on the tracked designated portion allocation, to determine the designated portion allocation based on whether the data transferred from the first cache 112 to the second cache 114 comes from one or more portions of the first cache 112 that are designated to be allocated for IO data, and/or to evict data from the second cache 114 to the first cache 112 to one or more portions of the first cache 112 indicated by the tracked designated portion allocation for the evicted data.

In some implementations, the circuitry 123 may be configured to store information associated with the second cache 114 that indicates the designated portion allocation for an entry of the second cache 114. In some examples, an entry in the second cache 114 may include a way allocation field to store the designated portion allocation for the entry. For example, the way allocation field may comprise or consist of a single bit that indicates whether the designated portion allocation for the entry corresponds to IO data or non-IO data (e.g. core data).

In some examples, the second cache 114 may be organized as two or more portions (e.g., ways), and the circuitry 123 may be further configured to designate one or more portions of the second cache 114 to be allocated to store IO data, and to store data from the first cache 112 in the designated one or more portions of the second cache 114 based at least in part on the determined designated portion allocation for the data from the first cache 112. In some implementations, the IC 100 may further include a third cache (not shown) coupled to the circuitry 123, where the circuitry 123 may be further configured to track the designated portion allocation for data transferred from the second cache 114 to the third cache. For example, the third cache may comprise an internal core level-one (L1) cache, the second cache 114 may comprises an internal core level-two (L2) cache, and/or the first cache 112 may comprise a last-level cache (LLC).

Figure 21:
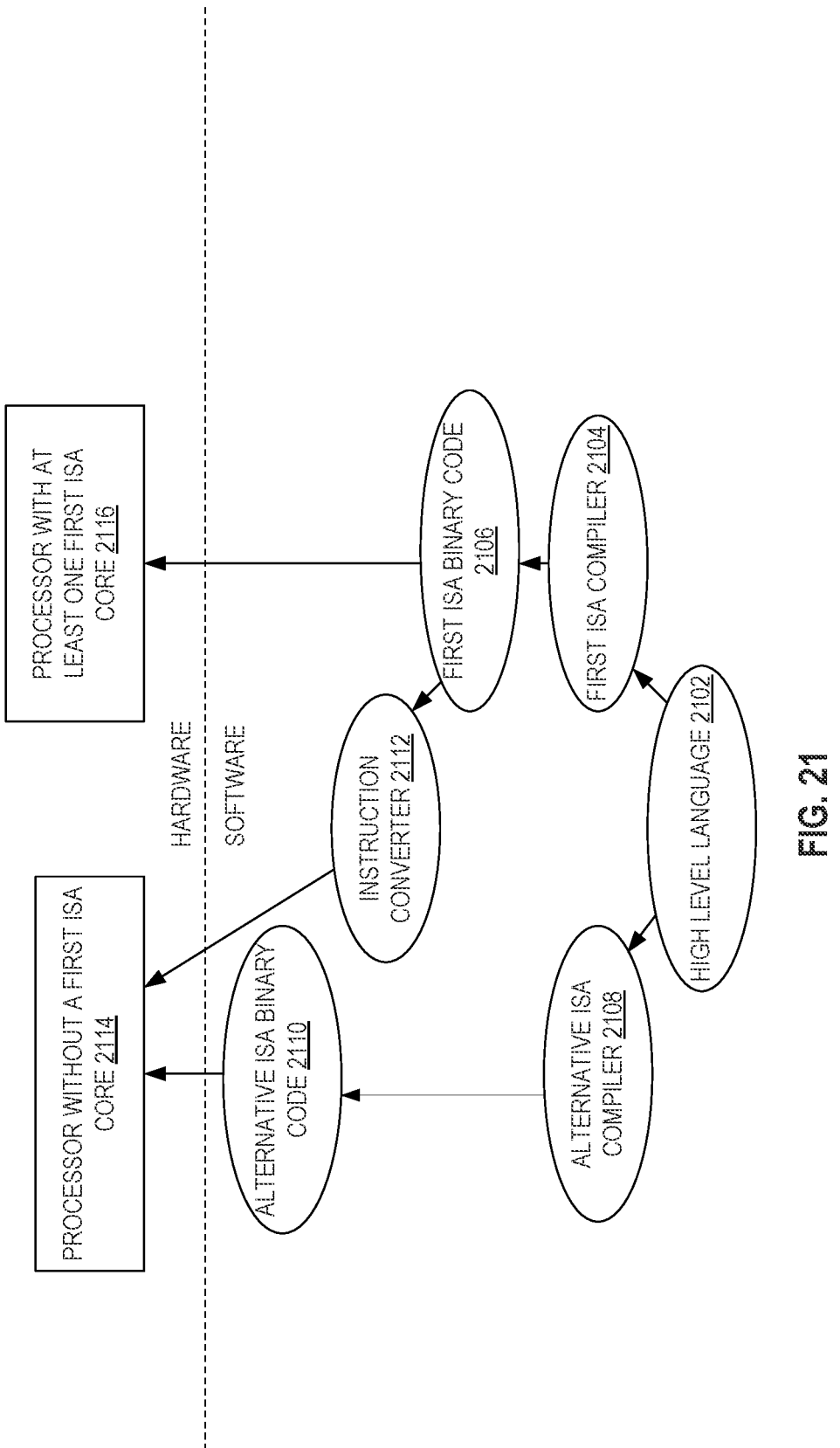
FIG. 21 is a block diagram illustrating the use of a software instruction converter to convert binary instructions in a source instruction set architecture to binary instructions in a target instruction set architecture according to examples.

For example, the first cache 112, the second cache 114, the third cache, and/or the circuitry 123 may be implemented/integrated/incorporated as/with/in any of the systems, processors, and controllers/agents described herein. In particular, the first cache 112, the second cache 114, the third cache, and/or the circuitry 123 may be implemented/integrated/incorporated as/with/in the processor 400 and/or the cache agent 412 (FIGS. 7 to 10), the cache home agent 800 and/or cache controller 840 (FIG. 11), the System on a Chip (SoC) 900 and/or the system agent unit 910 (FIG. 12), the system 1000 and/or the hub 1015 (FIG. 13), the server 1100 (FIG. 14), the core 1200 (FIG. 15), the system 350 (FIG. 4), the system 360 (FIG. 5), the system 370 (FIG. 6), the multi-processor system 1600, the processor 1670, the processor 1615, the coprocessor 1638, and/or the processor/coprocessor 1680 (FIG. 16), the processor 1700 (FIG. 17), the core 1890 (FIG. 18B), the execution units 1862 (FIGS. 18B and 19), and the processor 2116 (FIG. 21).

With reference to FIGS. 2A to 2C, an example of a method 200 may include determining a designated portion (e.g., way) allocation for data transferred from a first cache to a second cache at box 231, tracking the designated portion allocation for the data transferred from the first cache to the second cache at box 233, and separating IO data from non-IO (e.g., core) data based at least in part on the tracked designated portion allocation at box 234. Some examples of the method 200 may further include isolating IO data from non-IO data (e.g. core data) for data transferred from the second cache to the first cache based at least in part on the tracked designated portion allocation at box 235, determining the designated portion allocation based on whether the data transferred from the first cache to the second cache comes from one or more portions of the first cache that are designated to be allocated for IO data at box 237, and/or evicting data from the second cache to the first cache to one or more portions of the first cache indicated by the tracked designated portion allocation for the evicted data at box 239.

In some examples, the method 200 may additionally or alternatively include storing information associated with the second cache that indicates the designated portion allocation for an entry of the second cache at box 241. In some examples, an entry in the second cache may include a way allocation field to store the designated portion allocation for the entry at box 243. For example, the way allocation field may comprise or consist of a single bit that indicates whether the designated portion allocation for the entry corresponds to IO data or non-IO data (e.g. core data) at box 245.

In some examples, the second cache may be organized as two or more portions (e.g., ways) at box 247, and the method 200 may further include designating one or more portions of the second cache to be allocated to store IO data at box 249, and storing data from the first cache in the designated one or more portions of the second cache based at least in part on the determined designated portion allocation for the data from the first cache at box 251. In another example, the method may further include tracking the designated portion allocation for data transferred from the second cache to a third cache at box 253. For example, the third cache may comprise an internal core L1 cache at box 255, the second cache may comprise an internal core L2 cache at box 257, and/or the first cache may comprise a LLC at box 259.

For example, the method 200 may be performed by any of the systems, processors, and controllers/agents described herein. In some examples, on ore more aspects of the method 200 may be performed by the processor 400 and/or the cache agent 412 (FIGS. 7 to 10), the cache home agent 800 and/or cache controller 840 (FIG. 11), the System on a Chip (SoC) 900 and/or the system agent unit 910 (FIG. 12), the system 1000 and/or the hub 1015 (FIG. 13), the server 1100 (FIG. 14), the core 1200 (FIG. 15), the system 350 (FIG. 4), the system 360 (FIG. 5), the system 370 (FIG. 6), the multi-processor system 1600, the processor 1670, the processor 1615, the coprocessor 1638, and/or the processor/coprocessor 1680 (FIG. 16), the processor 1700 (FIG. 17), the core 1890 (FIG. 18B), the execution units 1862 (FIGS. 18B and 19), and the processor 2116 (FIG. 21).

With reference to FIG. 3, an example of an apparatus 300 may include a core 310 that includes a core-level cache 315, a next-level cache 320 organized as two or more portions (e.g., ways), and circuitry 330 (e.g., cache management circuitry) coupled to the core-level cache 315 and the next-level cache 320 to determine a designated portion allocation for data transferred from the next-level cache 320 to the core-level cache 315, track the designated portion allocation for the transferred from the next-level cache 320 to the core-level cache 315, and separate IO data (e.g., from IO device 340) from non-IO data (e.g., core data) based at least in part on the tracked designated portion allocation. For example, the next-level cache 320 may be a higher level or upper level as compared to the core-level cache 315 (e.g., if the core-level cache 315 is L2 cache, then the next-level cache 320 may be a L3 cache, LLC, etc.). In some examples, both core data and IO device data may be written to the same caches (e.g., the core-level cache 315 and/or next-level cache 320), and the circuitry 330 may track the data through the system and separate IO data from core data. In some implementations, the circuitry 330 may be further configured to isolate IO data from non-IO data (e.g. core data) for data transferred from the core-level cache 315 to the next-level cache 320 based at least in part on the tracked designated portion allocation, to determine the designated portion allocation based on whether the data transferred from the next-level cache 320 to the core-level cache 315 comes from one or more portions of the next-level cache 320 that are designated to be allocated for IO data, and/or to evict data from the core-level cache 315 to the next-level cache 320 to one or more portions of the next-level cache 320 indicated by the tracked designated portion allocation for the evicted data.

In some implementations, the circuitry 330 may be configured to store information associated with the core-level cache 315 that indicates the designated portion allocation for an entry of the core-level cache 315. In some examples, an entry in the core-level cache 315 may include a way allocation field to store the designated portion allocation for the entry. For example, the way allocation field may comprise or consist of a single bit that indicates whether the designated portion allocation for the entry corresponds to IO data or non-IO data (e.g. core data).

In some implementations, the core-level cache 315 may be organized as two or more portions (e.g., ways), and the circuitry 330 may be further configured to designate one or more portions of the core-level cache 315 to be allocated to store IO data, and to store data from the next-level cache 320 in the designated one or more portions of the core-level cache 315 based at least in part on the determined designated portion allocation for the data from the next-level cache 320. In another example, the core-level cache 315 may comprise an internal core level-two (L2) cache and the apparatus 300 may further comprise an internal core level-one (L1) cache (not shown) coupled to the circuitry 330. In this example, the circuitry 330 may be further configured to track the designated portion allocation for data transferred from the L2 cache to the L1 cache (e.g., and the next-level cache 320 may comprise a LLC).

For example, the core 310, the core-level cache 315, the next-level cache 320, the L1 cache, and/or the circuitry 330 may be implemented/integrated/incorporated as/with/in any of the systems, processors, and controllers/agents described herein. In particular the core 310, the core-level cache 315, the next-level cache 320, the L1 cache, and/or the circuitry 330 may be implemented/integrated/incorporated as/with/in the processor 400 and/or the cache agent 412 (FIGS. 7 to 10), the cache home agent 800 and/or cache controller 840 (FIG. 11), the System on a Chip (SoC) 900 and/or the system agent unit 910 (FIG. 12), the system 1000 and/or the hub 1015 (FIG. 13), the server 1100 (FIG. 14), the core 1200 (FIG. 15), the system 350 (FIG. 4), the system 360 (FIG. 5), the system 370 (FIG. 6), the multiprocessor system 1600, the processor 1670, the processor 1615, the coprocessor 1638, and/or the processor/coprocessor 1680 (FIG. 16), the processor 1700 (FIG. 17), the core 1890 (FIG. 18B), the execution units 1862 (FIGS. 18B and 19), and the processor 2116 (FIG. 21).

Some implementations of MDTI technology track the IO data as it flows through the system and uses cache allocation technology and direct to hardware IO to isolate the core data and IO data in the LLC. Some implementations may track and separate the IO data in the end-to-end flow. In one implementation, each cache line in the core's internal caches stores an additional bit (e.g., sometimes referred to herein as an "IO-bit") that indicates whether the line contains IO data or core data. Cache allocation technology may allocate specific ways of a cache (e.g., LLC) as ways for direct to hardware IO (e.g., sometimes referred to herein as "D2HIO ways"). When IO allocates new cache lines in the LLC, the newly allocated cache lines are placed in the D2HIO ways using the cache allocation technology. When a cache line is fetched into a core, the IO-bit in the core's internal cache is set to a first value (e.g., "1") if the line was fetched from a D2HIO way and set to a second value (e.g., "0") if the line was fetched from a non-D2HIO way. On evicting a cache line from the core, the cache line is allocated into the D2HIO ways if the IO-bit from the evicted cache line is the first value (e.g., "1") and into the non-D2HIO ways if the IO-bit from the evicted cache line is the second value (e.g., "0"). Some implementations may utilize an additional bit in the internal core cache and LLC path (e.g., or may utilize an existing sideband bit repurposed to support the end-to-end core and IO data isolation).

With reference to FIG. 4, an example of a computer system 350 includes a L2 cache 351 and a LLC 352. The LLC 352 has a set of ways designated as IO data ways 353 (e.g., to be allocated to IO data) and another set of ways designated as core data ways 354 (e.g., to be allocated to other data). Each cache line in the L2 cache 351 includes an IO-bit 355 that indicates whether or not the cache line stores data that originated from the IO data ways 353 or the core data ways 354.

In an illustrative example flow, cache line X0 is read from the IO data ways 353 and the corresponding entry in the L2 cache 351 has the IO-bit 355 for cache line X0 set to a first value V1 (e.g., one). Cache line Y0 is read from the core data ways 354 and the corresponding entry in the L2 cache 351 has the IO-bit 355 for cache line Y0 set to a second value V2 (e.g., zero). When a cache line is evicted from the L2 cache 351, the evicted cache line is allocated into the IO data ways 353 of the LLC 352 if the IO-bit 355 from the evicted cache line is V1 and into the core data ways 354 of the LLC 352 if the IO-bit 355 from the evicted cache line is V2. Accordingly, cache line X0 will be re-allocated in the IO data ways 353 upon eviction from the L2 cache 351 and cache line Y0 will be re-allocated in the core data ways 354 upon eviction from the L2 cache 351. Advantageously, cache lines may transition between the L2 cache 351 and the LLC 352 with core and IO data isolated from each other.

With reference to FIG. 5, an example of a computer system 360 includes a L1 cache 361, a L2 cache 362 and a L3 cache 363. The L3 cache 363 has a set of ways designated as IO data ways 364 (e.g., to be allocated to IO data) and another set of ways designated as core data ways 365 (e.g., to be allocated to other data). Each cache line in the L2 cache 362 includes an IO-bit 366 that indicates whether or not the cache line stores data that originated from the IO data ways 364 or the core data ways 365. Each cache line in the L1 cache 361 also includes an IO-bit 367 that indicates whether or not the cache line stores data that originated from the IO data ways 364 or the core data ways 365 (e.g., that may be determined by the value of the IO-bit 366 for the cache line entry when the cache line is read from the L2 cache 362). In this example, IO data may be tracked and separated in an end-to-end flow between the L1 cache 361, the L2 cache 362 and the L3 cache 363. Advantageously, interference between IO and core data may be reduced not just in the L3 cache 363 (e.g., that may correspond to the LLC) but also in the L1 cache 361 and the L2 cache 362 (e.g., that may correspond to the core internal caches).

Figure 6:
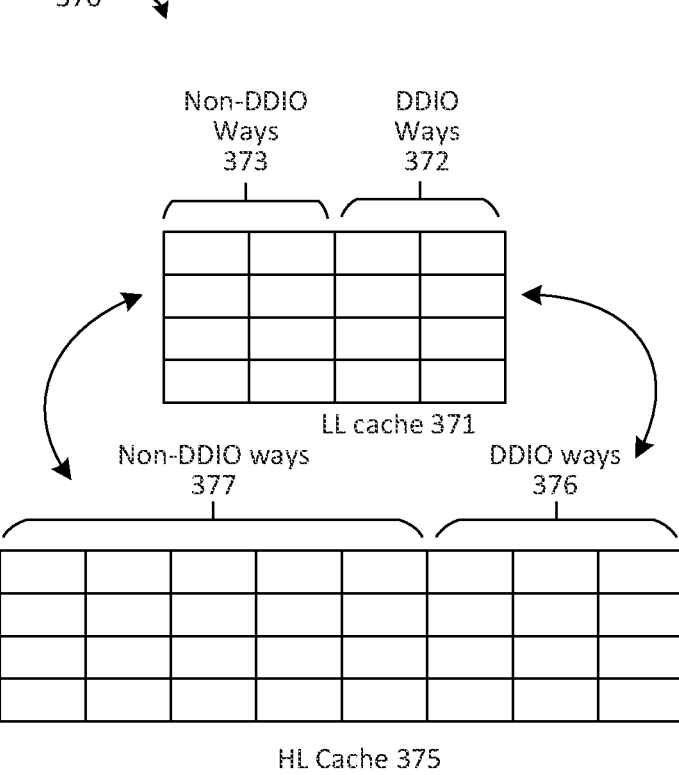
FIG. 6 is a block diagram of another example of a computer system that includes multi-level cache data tracking and isolation technology in one implementation.

With reference to FIG. 6, an example of a computer system 370 includes a lower-level (LL) cache 371 (e.g., a core-level cache, an L1 cache, a L2 cache, etc.), e.g., and a higher-level (HL) cache 375 (e.g., an L3 cache, a LLC, etc.) and utilizes INTEL® DDIO technology to facilitate the core and IO interaction. The HL cache 375 is organized as two or more ways and has a set of ways designated as DDIO ways 376 (e.g., to be allocated to DDIO data) and another set of ways designated as non-DDIO ways 377 (e.g., to be allocated to other data). The LL cache 371 is also organized as two or more ways with a set of ways designated as DDIO ways 372 (e.g., to be allocated to DDIO data) and another set of ways designated as non-DDIO ways 373 (e.g., to be allocated to other data). When a cache line is read from the HL cache 375 into the LL cache 371, the cache line is allocated in the DDIO ways 372 of the LL cache 371 if the line was read from a DDIO way 376 of the HL cache 375, and the cache line is allocated in the non-DDIO ways 373 of the LL cache 371 if the line was read from a non-DDIO way 377 of the HL cache 375.

The LL and HL caches 371, 375 do not necessarily have the same total number of ways or the same number of ways designated as DDIO ways 372, 376. On evicting a cache line from the LL cache 371, the cache line is allocated into the DDIO ways 376 of the HL cache 375 if the cache line is evicted from a DDIO way 372 and into the non-DDIO ways 377 if the cache line is evicted from a non-DDIO way 373.

In some implementations, a computer system may include any useful number of cache levels and each cache level may be organized as two or more ways with a set of one or more ways designated as DDIO ways to be allocated to DDIO data and another set of one or more ways designated as non-DDIO ways to be allocated to other data. In this example, DDIO data may be tracked and separated in an end-to-end flow as DDIO data transitions between all of the cache levels. Advantageously, some implementations may reduce core and IO data interference in all cache levels, including the core internal caches, by extending the utilization of DDIO ways to all cache levels, including the core internal caches, with separate ways for DDIO data at each cache level. In an implementation that uses INTEL® DDIO technology with a LLC and internal L1 and L2 core caches, for example, data fetched from the LLC DDIO ways is placed in the L2 DDIO ways and subsequently in the L1 DDIO ways. Subsequently, the data evicted out from the L2/L1 DDIO ways is placed in the LLC DDIO ways.

Although described in connection with examples of direct to hardware and DDIO way designations, those skilled in the art will appreciate that implementations may provide technology to track and separate other or different way designations and two or more way designations. For example, where an IO-bit is provided to track a way designation, a cache entry may include multiple IO-bits to track multiple way designations. Cache allocation technology may provide a wide variety of configurations or controls to designate how ways may be allocated, and implementations may be suitably configured to track any such way designations. Non-limiting examples of other way designations include ways designated to be allocated according to a way number, a way number mask, a workload, a workload type, a stream identifier (ID), a thread ID, an application (e.g., by application ID), a virtual machine (VMID), a process ID, and some other unique ID (UID). Although described in connection with examples of two or three cache levels, those skilled in the art will appreciate that implementations may provide technology to track and separate way designation end-to-end through any useful number of cache levels.

Although some examples have been described in connection with a single field that consists of a single bit to track way designations, those skilled in the art will appreciate that any useful number of fields and/or bits may be utilized in implementations of suitable MDTI technology. In some examples, the fields/bit may be a mask.

In some implementations, various aspects of the MDTI technology may be tunable, programmable, or otherwise configurable. For example, cache allocation technology may utilize one or more registers (e.g., model specific registers (MSRs)) to provide information that may be utilized to allocate specific ways of a specific cache for designated types of data (e.g., DDIO). Some implementations may read the same registers utilized by the cache allocation technology to determine respective designated way allocations to track and how each way of the specific cache is designated (e.g., which ways of the LLC are DDIO ways). Additionally, or alternatively, some implementations may utilize separate dedicated configuration registers (e.g., MSRs) to enable/disable the tracking at one or more levels of cache, to specify how many and/or which ways to utilize for tracking at one or more cache level (e.g., for the L1/L2 caches), etc.

Figure 7:
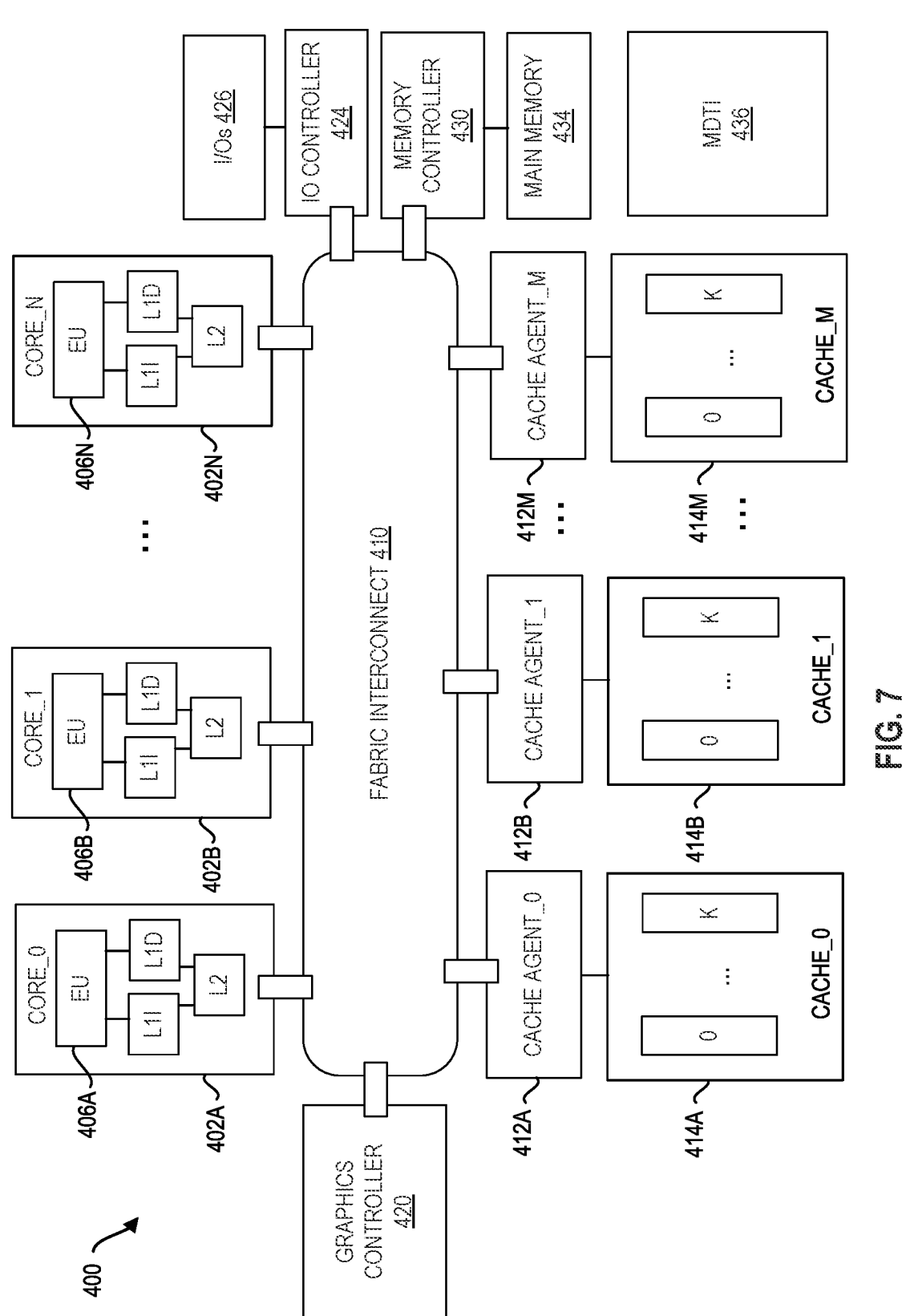
FIG. 7 is a block diagram of an example of a processor that includes multi-level cache data tracking and isolation technology in one implementation.

FIG. 7 is a block diagram of a processor 400 with a plurality of cache agents 412 and caches 414 in accordance with certain examples. In a particular example, processor 400 may be a single integrated circuit, though it is not limited thereto. The processor 400 may be part of a SoC in various examples. The processor 400 may include, for example, one or more cores 402A, 402B . . . 402N (collectively, cores 402). In a particular example, the cores 402 may include a corresponding execution unit (EU) 406A, 406B, or 406N, level one instruction (L1I) cache, level one data cache (L1D), and level two (L2) cache. The processor 400 may further include one or more cache agents 412A, 412B . . . 412M (any of these cache agents may be referred to herein as cache agent 412), and corresponding caches 414A, 414B . . . 414M (any of these caches may be referred to as cache 414). In a particular example, a cache 414 is a last level cache (LLC) slice. An LLC may be made up of any suitable number of LLC slices. Each cache may include one or more banks of memory that corresponds (e.g., duplicates) data stored in system memory 434. The processor 400 may further include a fabric interconnect 410 comprising a communications bus (e.g., a ring or mesh network) through which the various components of the processor 400 connect. In one example, the processor 400 further includes a graphics controller 420, an IO controller 424, and a memory controller 430. The IO controller 424 may couple various IO devices 426 to components of the processor 400 through the fabric interconnect 410. Memory controller 430 manages memory transactions to and from system memory 434.

The processor 400 may be any type of processor, including a general purpose microprocessor, special purpose processor, microcontroller, coprocessor, graphics processor, accelerator, field programmable gate array (FPGA), or other type of processor (e.g., any processor described herein). The processor 400 may include multiple threads and multiple execution cores, in any combination. In one example, the processor 400 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (IO) interfaces (e.g., serial links, DDR memory channels) and associated controllers, network controllers, fabric controllers, or any combination thereof.

System memory 434 stores instructions and/or data that are to be interpreted, executed, and/or otherwise used by the cores 402A, 402B . . . 402N. The cores 402 may be coupled towards the system memory 434 via the fabric interconnect 410. In some examples, the system memory 434 has a dual-inline memory module (DIMM) form factor or other suitable form factor.

The system memory 434 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or three-dimensional (3D) NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory array is synchronous dynamic random access memory (SDRAM). In some examples, any portion of system memory 434 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., cache 414) may include any type of volatile or non-volatile memory, including any of those listed above. Processor 400 is shown as having a multi-level cache architecture. In one example, the cache architecture includes an on-die or on-package L1 and L2 cache and an on-die or on-chip LLC (though in other examples the LLC may be off-die or off-chip) which may be shared among the cores 402A, 402B, . . . 402N, where requests from the cores are routed through the fabric interconnect 410 to a particular LLC slice (e.g., a particular cache 414) based on request address. Any number of cache configurations and cache sizes are contemplated. Depending on the architecture, the cache may be a single internal cache located on an integrated circuit or may be multiple levels of internal caches on the integrated circuit. Other examples include a combination of both internal and external caches depending on particular examples.

During operation, a core 402A, 402B . . . or 402N may send a memory request (read request or write request), via the L1 caches, to the L2 cache (and/or other mid-level cache positioned before the LLC). In one case, a memory controller 430 may intercept a read request from an L1 cache. If the read request hits the L2 cache, the L2 cache returns the data in the cache line that matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 434. In another case, the cache agent 412 may intercept a write request from an L1 cache. If the write request hits the L2 cache after a tag lookup, then the cache agent 412 may perform an in-place write of the data in the cache line. If there is a miss, the cache agent 412 may create a read request to the LLC to bring in the data to the L2 cache. If there is a miss in the LLC, the data is retrieved from system memory 434. Various examples contemplate any number of caches and any suitable caching implementations.

A cache agent 412 may be associated with one or more processing elements (e.g., cores 402) and may process memory requests from these processing elements. In various examples, a cache agent 412 may also manage coherency between all of its associated processing elements. For example, a cache agent 412 may initiate transactions into coherent memory and may retain copies of data in its own cache structure. A cache agent 412 may also provide copies of coherent memory contents to other cache agents.

In various examples, a cache agent 412 may receive a memory request and route the request towards an entity that facilitates performance of the request. For example, if cache agent 412 of a processor receives a memory request specifying a memory address of a memory device (e.g., system memory 434) coupled to the processor, the cache agent 412 may route the request to a memory controller 430 that manages the particular memory device (e.g., in response to a determination that the data is not cached at processor 400. As another example, if the memory request specifies a memory address of a memory device that is on a different processor (but on the same computing node), the cache agent 412 may route the request to an inter-processor communication controller (e.g., controller 604 of FIG. 9) which communicates with the other processors of the node. As yet another example, if the memory request specifies a memory address of a memory device that is located on a different computing node, the cache agent 412 may route the request to a fabric controller (which communicates with other computing nodes via a network fabric such as an Ethernet fabric, an Intel® Omni-Path Fabric, an Intel® True Scale Fabric, an InfiniBand-based fabric (e.g., Infiniband Enhanced Data Rate fabric), a RapidIO fabric, or other suitable board-to-board or chassis-to-chassis interconnect).

In particular examples, the cache agent 412 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 412 processes a memory request, it may consult the system address decoder to determine where to send the memory request.

In particular examples, a cache agent 412 may be a combined caching agent and home agent, referred to herein in as a caching home agent (CHA). A caching agent may include a cache pipeline and/or other logic that is associated with a corresponding portion of a cache memory, such as a distributed portion (e.g., 414) of a last level cache. Each individual cache agent 412 may interact with a corresponding LLC slice (e.g., cache 414). For example, cache agent 412A interacts with cache 414A, cache agent 412B interacts with cache 414B, and so on. A home agent may include a home agent pipeline and may be configured to protect a given portion of a memory such as a system memory 434 coupled to the processor. To enable communications with such memory, CHAs may be coupled to memory controller 430.

In general, a CHA may serve (via a caching agent) as the local coherence and cache controller and also serve (via a home agent) as a global coherence and memory controller interface. In an example, the CHAs may be part of a distributed design, wherein each of a plurality of distributed CHAs are each associated with one of the cores 402. Although in particular examples a cache agent 412 may comprise a cache controller and a home agent, in other examples, a cache agent 412 may comprise a cache controller but not a home agent.

Various examples of the present disclosure may provide MDTI circuitry 436 for any suitable component of the processor 400 (e.g., a core 402, a cache agent 412, a memory controller 430, etc.) that allows the component to track and isolate data for the multiple levels of cache (e.g., L1, L2, LLC, etc.) in the entire end-to-end flow. Although the MDTI circuitry 436 is shown as a separate module, one or more aspects of the MDTI technology may be integrated with various components of the processor 400 (e.g., as part of the cache agents 412, as part of the cores 402, as part of the memory controller 430, etc.).

In some implementations, the cache 414 may be organized as two or more ways and the MDTI circuitry 436 may be configured to determine a designated way allocation for data transferred from the cache 414 to the L2 caches of the cores 402. The MDTI circuitry 436 may be further configured to track the designated way allocation (e.g., an IO way, a non-IO way, etc.) for the data transferred from the from the cache 414 to the L2 caches and isolate the data from other data based at least in part on the tracked designated way allocation. The MDTI circuitry 436 may also be configured to evict data from the L2 caches to one or more ways of the to the cache 414 indicated by the tracked designated way allocation for the evicted data. In some implementations, the MDTI circuitry 436 may provide similar data tracking and isolation for each level of the cache hierarchy (e.g., including the L1 caches of the cores 402).

Any suitable technology may be utilized for tracking and isolation. For example, the MDTI circuitry 436 may main a data structure to track the data and may further utilize cache allocation technology to isolate the data. In some implementations, the data structure may be part of the various caches themselves (e.g., one or more bits or fields in each cache entry that track the designated way information). In some implementations, in addition to the cache 114, one or more of the other cache levels (e.g., lower levels caches L2, L1) may also be organized as two or more ways. Where multiple cache levels are organized with multiple ways, the MDTI circuitry 436 may be configured to promote and demote data between the cache levels into and out of ways that have the same way designations. For example, data from IO ways of the LLC will be allocated in IO ways of the L2/L1 caches and data evicted from IO ways of the L 1/L2 caches will be allocated in IO ways of the LLC.

The bandwidth provided by a coherent fabric interconnect 410 (which may provide an external interface to a storage medium to store the captured trace) may allow lossless monitoring of the events associated with the caching agents 412. In various examples, the events at each cache agent 412 of a plurality of cache agents of a processor may be tracked. Accordingly, the MDTI technology may successfully track and isolate data for a multi-level cache at runtime without requiring the processor 400 to be globally deterministic.

IO controller 424 may include logic for communicating data between processor 400 and IO devices 426, which may refer to any suitable devices capable of transferring data to and/or receiving data from an electronic system, such as processor 400. For example, an IO device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An IO device 426 may communicate with IO controller 424 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various examples, IO devices 426 coupled to the IO controller 424 may be located off-chip (e.g., not on the same integrated circuit or die as a processor) or may be integrated on the same integrated circuit or die as a processor.

Memory controller 430 is an integrated memory controller (e.g., it is integrated on the same die or integrated circuit as one or more cores 402 of the processor 400) that includes logic to control the flow of data going to and from system memory 434. Memory controller 430 may include logic operable to read from a system memory 434, write to a system memory 434, or to request other operations from a system memory 434. In various examples, memory controller 430 may receive write requests originating from cores 402 or IO controller 424 and may provide data specified in these requests to a system memory 434 for storage therein. Memory controller 430 may also read data from system memory 434 and provide the read data to IO controller 424 or a core 402. During operation, memory controller 430 may issue commands including one or more addresses (e.g., row and/or column addresses) of the system memory 434 in order to read data from or write data to memory (or to perform other operations). In some examples, memory controller 430 may be implemented in a different die or integrated circuit than that of cores 402.

Although not depicted, a computing system including processor 400 may use a battery, renewable energy converter (e.g., solar power or motion-based energy), and/or power supply outlet connector and associated system to receive power, a display to output data provided by processor 400, or a network interface allowing the processor 400 to communicate over a network. In various examples, the battery, power supply outlet connector, display, and/or network interface may be communicatively coupled to processor 400.

Figure 8:
FIG. 8 is a block diagram of an example of a cache agent that includes multi-level cache data tracking and isolation technology in one implementation.

FIG. 8 is a block diagram of a cache agent 412 comprising a MDTI module 508 in accordance with certain examples. The MDTI module 508 may include one or more aspects of any of the examples described herein. The MDTI module 508 may be implemented using any suitable logic. In a particular example, the MDTI module 508 may be implemented through firmware executed by a processing element of cache agent 412. In this example, the MDTI module 508 provides multi-level cache data tracking and isolation for the cache 414.

In a particular example, a separate instance of a MDTI module 508 may be included within each cache agent 412 for each cache controller 502 of a processor 400. In another example, a MDTI module 508 may be coupled to multiple cache agents 412 and provide multi-level cache data tracking and isolation for each of the cache agents. The processor 400 may include a coherent fabric interconnect 410 (e.g., a ring or mesh interconnect) that connects the cache agents

412 to each other and to other agents which are able to support a relatively large amount of bandwidth (some of which is to be used to communicate traced information to a storage medium), such as at least one IO controller (e.g., a PCIe controller) and at least one memory controller.

The coherent fabric control interface 504 (which may include any suitable number of interfaces) includes request interfaces 510, response interfaces 512, and sideband interfaces 514. Each of these interfaces is coupled to cache controller 502. The cache controller 502 may issue writes 516 to coherent fabric data 506.

A throttle signal 526 is sent from the cache controller 502 to flow control logic of the interconnect fabric 410 (and/or components coupled to the interconnect fabric 410) when bandwidth becomes constrained (e.g., when the amount of bandwidth available on the fabric is not enough to handle all of the writes 516). In a particular example, the throttle signal 526 may go to a mesh stop or ring stop which includes a flow control mechanism that allows acceptance or rejection of requests from other agents coupled to the interconnect fabric. In various examples, the throttle signal 526 may be the same throttle signal that is used to throttle normal traffic to the cache agent 412 when a receive buffer of the cache agent 412 is full. In a particular example, the sideband interfaces 514 (which may carry any suitable messages such as credits used for communication) are not throttled, but sufficient buffering is provided in the cache controller 502 to ensure that events received on the sideband interface(s) are not lost.

Figure 9:
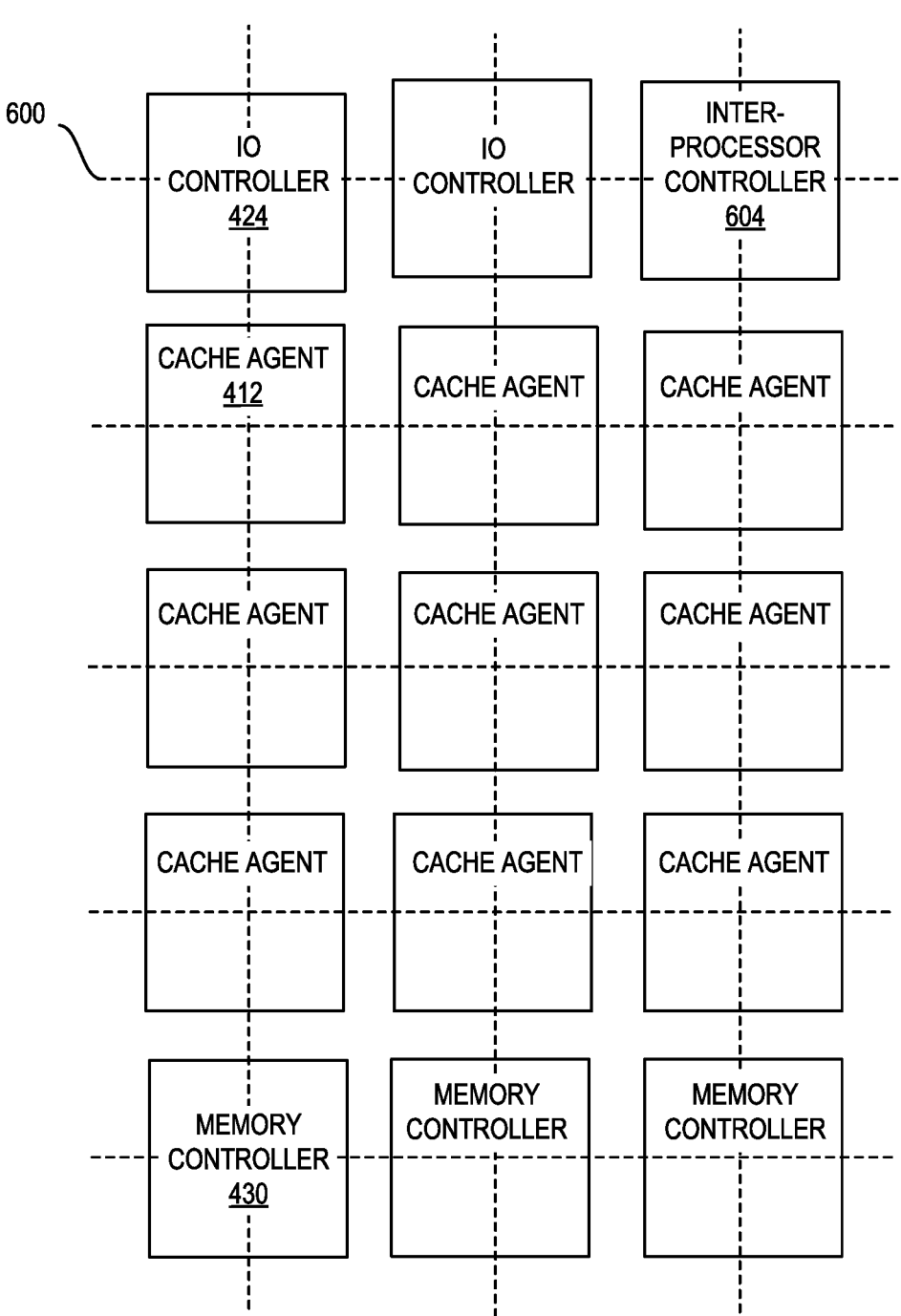
FIG. 9 is an illustrative diagram of an example of a mesh network comprising cache agents that include multi-level cache data tracking and isolation technology in one implementation.

FIG. 9 is an example mesh network 600 comprising cache agents 412 in accordance with certain examples. The mesh network 600 is one example of an interconnect fabric 410 that may be used with various examples of the present disclosure. The mesh network 600 may be used to carry requests between the various components (e.g., IO controllers 424, cache agents 412, memory controllers 430, and inter-processor controller 604).

Inter-processor communication controller 604 provides an interface for inter-processor communication. Inter-processor communication controller 604 may couple to an interconnect that provides a transportation path between two or more processors. In various examples, the interconnect may be a point-to-point processor interconnect, and the protocol used to communicate over the interconnect may have any suitable characteristics of Intel® Ultra Path Interconnect (UPI), Intel® QuickPath Interconnect (QPI), or other known or future inter-processor communication protocol. In various examples, inter-processor communication controller 604 may be a UPI agent, QPI agent, or similar agent capable of managing inter-processor communications.

Figure 10:
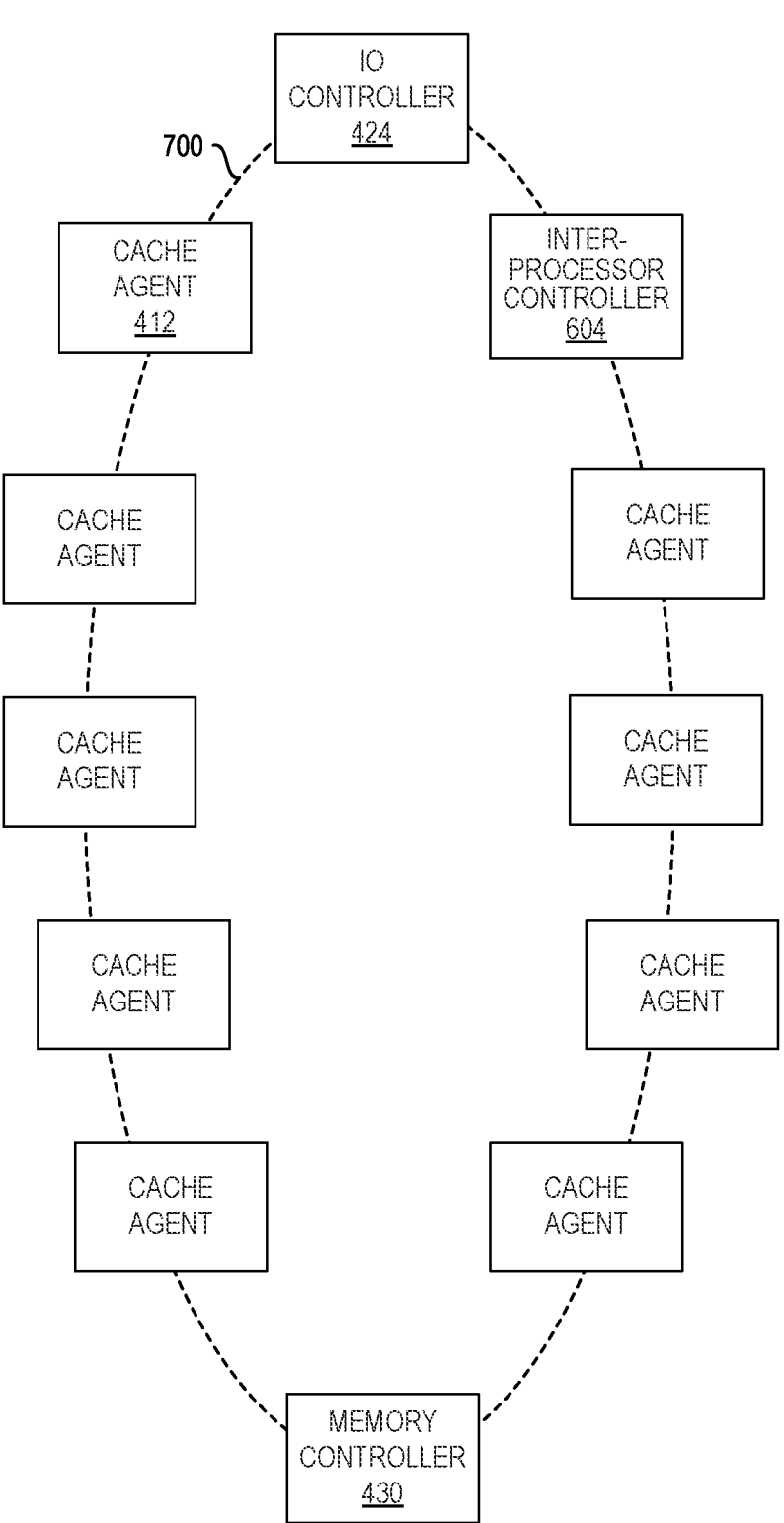
FIG. 10 is an illustrative diagram of an example of a ring network comprising cache agents that include multi-level cache data tracking and isolation technology in one implementation.

FIG. 10 is an example ring network comprising cache agents 412 in accordance with certain examples. The ring network 700 is one example of an interconnect fabric 410 that may be used with various examples of the present disclosure. The ring network 700 may be used to carry requests between the various components (e.g., IO controllers 424, cache agents 412, memory controllers 430, and inter-processor controller 604).

Figure 11:
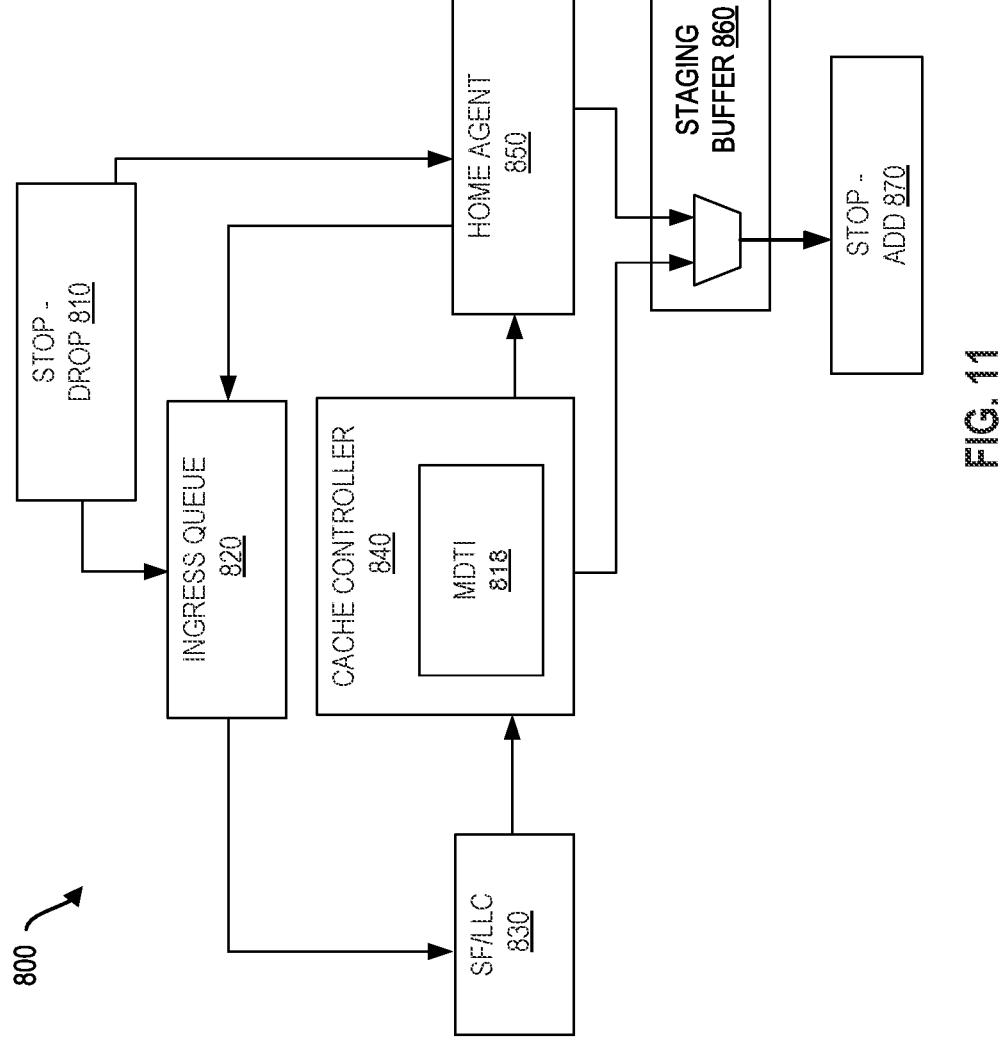
FIG. 11 is a block diagram of an example of a cache home agent that includes multi-level cache data tracking and isolation technology in one implementation.

FIG. 11 is a block diagram of another example of a cache agent 800 comprising MDTI technology in accordance with certain examples. In the example depicted, cache agent 800 is a CHA 800, which may be one of many distributed CHAs that collectively form a coherent combined caching home agent for processor 400 (e.g., as the cache agent 412). In general, the CHA includes various components that couple between interconnect interfaces. Specifically, a first interconnect stop 810 provides inputs from the interconnect fabric 410 to CHA 800 while a second interconnect stop 870 provides outputs from the CHA to interconnect fabric 410. In an example, a processor may include an interconnect fabric such as a mesh interconnect or a ring interconnect such that stops 810 and 870 are configured as mesh stops or ring stops to respectively receive incoming information and to output outgoing information.

As illustrated, first interconnect stop 810 is coupled to an ingress queue 820 that may include one or more entries to receive incoming requests and pass them along to appropriate portions of the CHA. In the implementation shown, ingress queue 820 is coupled to a portion of a cache memory hierarchy, specifically a snoop filter (SF) cache and a LLC (SF/LLC) 830 (which may be a particular example of cache 414). In general, a snoop filter cache of the SF/LLC 830 may be a distributed portion of a directory that includes a plurality of entries that store tag information used to determine whether incoming requests hit in a given portion of a cache. In an example, the snoop filter cache includes entries for a corresponding L2 cache memory to maintain state information associated with the cache lines of the L2 cache. However, the actual data stored in this L2 cache is not present in the snoop filter cache, as the snoop filter cache is rather configured to store the state information associated with the cache lines. In turn, LLC portion of the SF/LLC 830 may be a slice or other portion of a distributed last level cache and may include a plurality of entries to store tag information, cache coherency information, and data as a set of cache lines. In some examples, the snoop filter cache may be implemented at least in part via a set of entries of the LLC including tag information.

Cache controller 840 may include various logic to perform cache processing operations. In general, cache controller 840 may be configured as a pipelined logic (also referred to herein as a cache pipeline) that further includes MDTI technology implemented with MDTI circuitry 818 for lookup requests. The cache controller 840 may perform various processing on memory requests, including various preparatory actions that proceed through a pipelined logic of the caching agent to determine appropriate cache coherency operations. SF/LLC 830 couples to cache controller 840. Response information may be communicated via this coupling based on whether a lookup request (received from ingress queue 820) hits (or not) in the snoop filter/LLC 830. In general, cache controller 840 is responsible for local coherency and interfacing with the SF/LLC 830, and may include one or more trackers each having a plurality of entries to store pending requests.

As further shown, cache controller 840 also couples to a home agent 850 which may include a pipelined logic (also referred to herein as a home agent pipeline) and other structures used to interface with and protect a corresponding portion of a system memory. In general, home agent 850 may include one or more trackers each having a plurality of entries to store pending requests and to enable these requests to be processed through a memory hierarchy. For read requests that miss the snoop filter/LLC 830, home agent 850 registers the request in a tracker, determines if snoops are to be spawned, and/or memory reads are to be issued based on a number of conditions. In an example, the cache memory pipeline is roughly nine (9) clock cycles, and the home agent pipeline is roughly four (4) clock cycles. This allows the CHA 800 to produce a minimal memory/cache miss latency using an integrated home agent.

Outgoing requests from cache controller 840 and home agent 850 couple through a staging buffer 860 to interconnect stop 870. In an example, staging buffer 860 may include selection logic to select between requests from the two pipeline paths. In an example, cache controller 840 generally may issue remote requests/responses, while home agent 850 may issue memory read/writes and snoops/forwards.

With the arrangement shown in FIG. 11, first interconnect stop 810 may provide incoming snoop responses or memory responses (e.g., received from off-chip) to home agent 850. Via coupling between home agent 850 and ingress queue 820, home agent completions may be provided to the ingress queue. In addition, to provide for optimized handling of certain memory transactions as described herein (updates such as updates to snoop filter entries), home agent 850 may further be coupled to cache controller 840 via a bypass path, such that information for certain optimized flows can be provided to a point deep in the cache pipeline of cache controller 840. Note also that cache controller 840 may provide information regarding local misses directly to home agent 850. While a particular cache agent architecture is shown in FIG. 11, any suitable cache agent architectures are contemplated in various examples of the present disclosure.

The figures below detail exemplary architectures and systems to implement examples of the above. In some examples, one or more hardware components and/or instructions described above are emulated as detailed below, or implemented as software modules.

Processor cores may be implemented in different ways, for different purposes, and in different processors. For instance, implementations of such cores may include: 4) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 4) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 4) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a SoC that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 12:
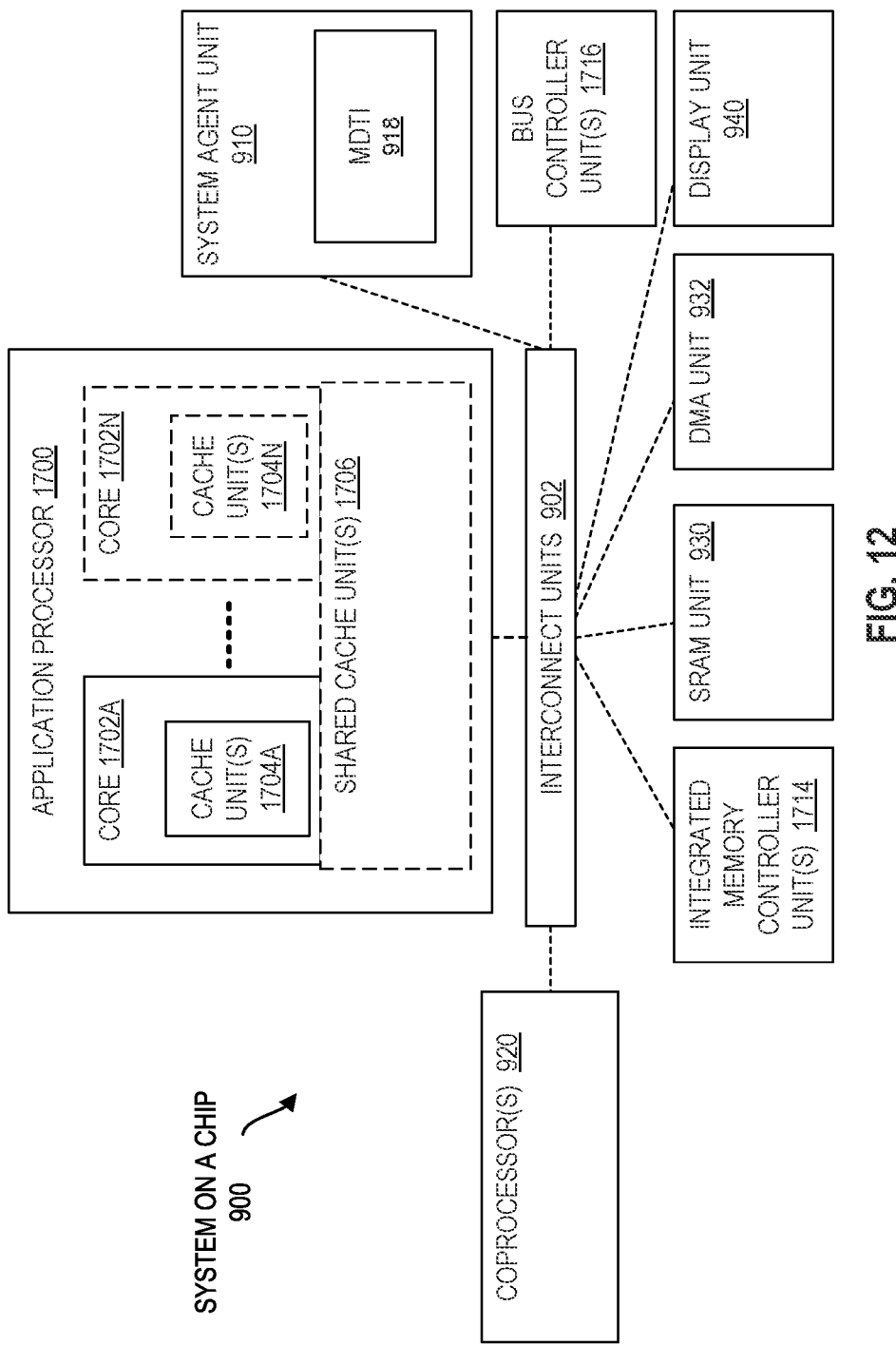
FIG. 12 is a block diagram of an example of a system on a chip that includes multi-level cache data tracking and isolation technology in one implementation.

FIG. 12 depicts a block diagram of a SoC 900 in accordance with an example of the present disclosure. Similar elements in FIG. 17 bear similar reference numerals. Also, dashed lined boxes are optional features on more advanced SoCs. In FIG. 12, an interconnect unit(s) 902 is coupled to: an application processor 1700 which includes a set of one or more cores 1702A-N with cache unit(s) 1704A-N and shared cache unit(s) 1706; a bus controller unit(s) 1716; an integrated memory controller unit(s) 1714; a set or one or more coprocessors 920 which may include integrated graphics logic, an image processor, an audio processor, and a video processor; an static random access memory (SRAM) unit 930; a direct memory access (DMA) unit 932; a display unit 940 for coupling to one or more external displays; and a system agent unit 910 that includes MDTI technology, as described herein, implemented with MDTI circuitry 918 to track and isolate data end-to-end as the data flows through various levels of cache/memory of the SoC 900. In one example, the coprocessor(s) 920 include a special-purpose processor, such as, for example, a network or communication processor, compression and/or decompression engine, GPGPU, a high-throughput MIC processor, embedded processor, or the like.

Figure 13:
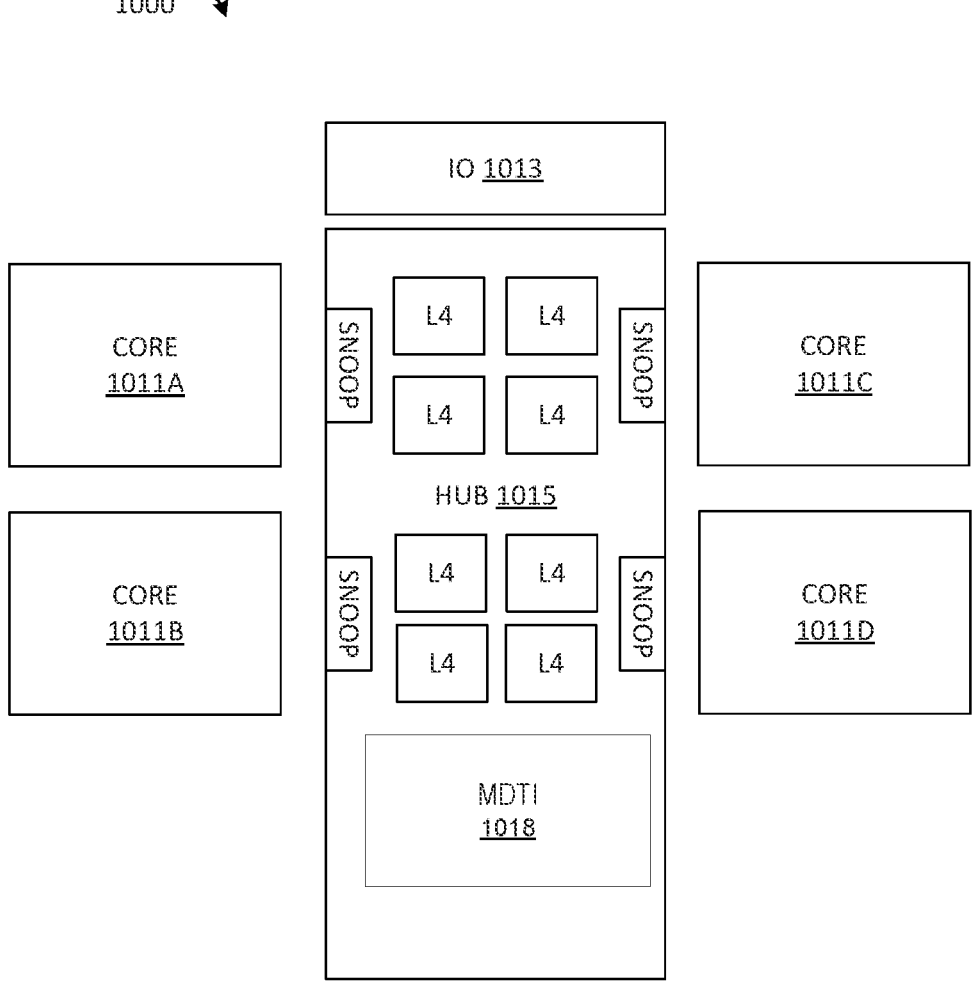
FIG. 13 is a block diagram of an example of a system that includes multi-level cache data tracking and isolation technology in one implementation.

With reference to FIG. 13, an example of a system 1000 includes various caches that may utilize examples of the MDTI technology described herein. In some examples, a last-level cache (LLC) may utilize MDTI technology. In some examples, as shown in FIG. 13, a level four (L4) cache may utilize MDTI technology. For example, the system 1000 includes multiple processor cores 1011A-D and an IO interface 1013 (e.g., a compute express link (CXL) interface coupled to a hub 1015 (e.g., a platform controller hub (PCH)). The hub 1015 includes L4 cache and snoop filters (e.g., ULTRA PATH INTERCONNECT (UPI) snoop filters). One or more of the IO interface 1013, the snoop filters, the cores 1011 (e.g., in connection with either an L1 or L2 cache), and the hub 1015 may be configured to utilize examples of the MDTI technology described herein. As illustrated, the hub 1015 is configured to implement MDTI circuitry 1018.

Figure 14:
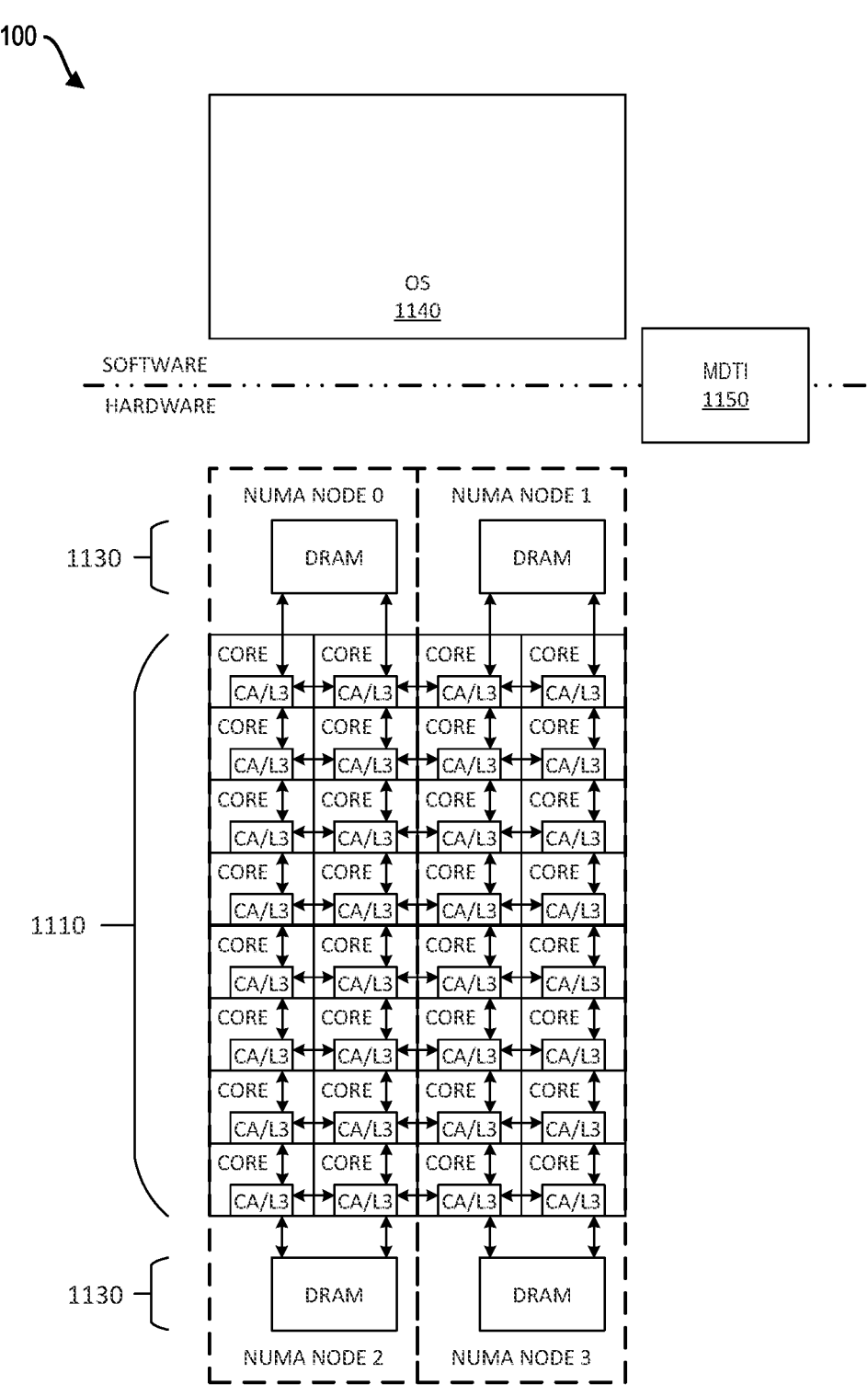
FIG. 14 is an illustrative diagram of an example of a server that includes multi-level cache data tracking and isolation technology in one implementation.

With reference to FIG. 14, an embodiment of a server 1100 includes a processor 1110 that supports SNC. As shown in FIG. 14, multiple cores each include a caching agent (CA) and L3 cache as a last-level cache (LLC) for system memory 1130 (e.g., DRAM) logically partitioned into four clusters (e.g., organized in SNC-4 mode with NUMA node 0 through NUMA node 3). The user can pin each software thread to a specific cluster, and if data is managed data appropriately, LLC and DRAM access latencies and/or on-die interconnect traffic may be reduced. The server 1100 includes an OS 1140 and MDTI technology 1150 (e.g., both hardware and software aspects) as described herein.

Figure 15:
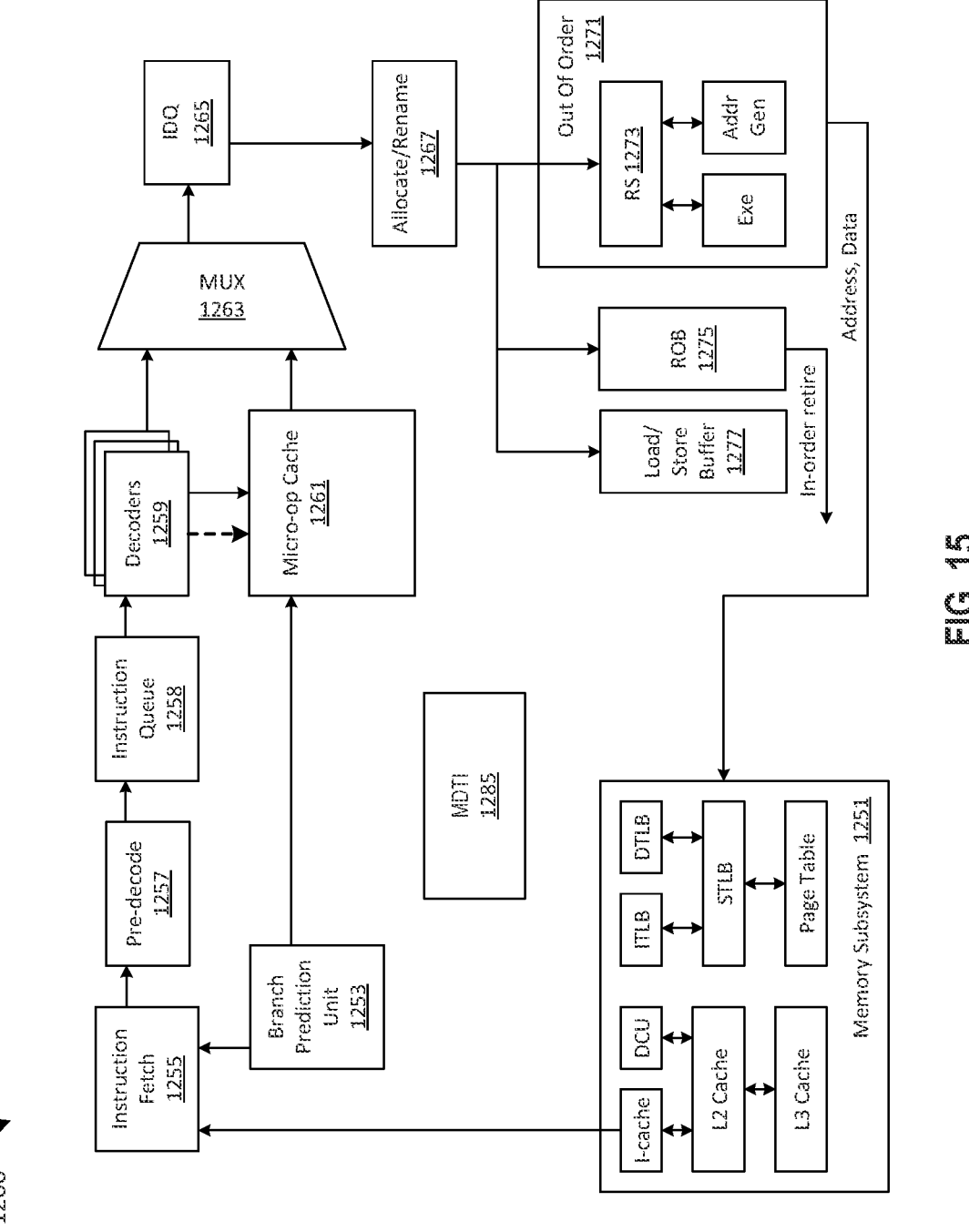
FIG. 15 is an illustrative diagram of an example of a processor that includes multi-level cache data tracking and isolation technology in one implementation.

With reference to FIG. 15, an embodiment of an out-of-order (OOO) processor core 1200 includes a memory subsystem 1251, a branch prediction unit (BPU) 1253, an instruction fetch circuit 1255, a pre-decode circuit 1257, an instruction queue 1258, decoders 1259, a micro-op cache 1261, a mux 1263, an instruction decode queue (IDQ) 1265, an allocate/rename circuit 1267, an out-of-order core 1271, a reservation station (RS) 1273, a re-order buffer (ROB) 1275, and a load/store buffer 1277, connected as shown. The memory subsystem 1251 includes a level-1 (L1) instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 1271 includes the RS 1273, an Exe circuit, and an address generation circuit, connected as shown. The core 1200 may further include MDTI circuitry 1285, and other circuitry as described herein, to track and isolate data through the multiple levels of cache.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 16:
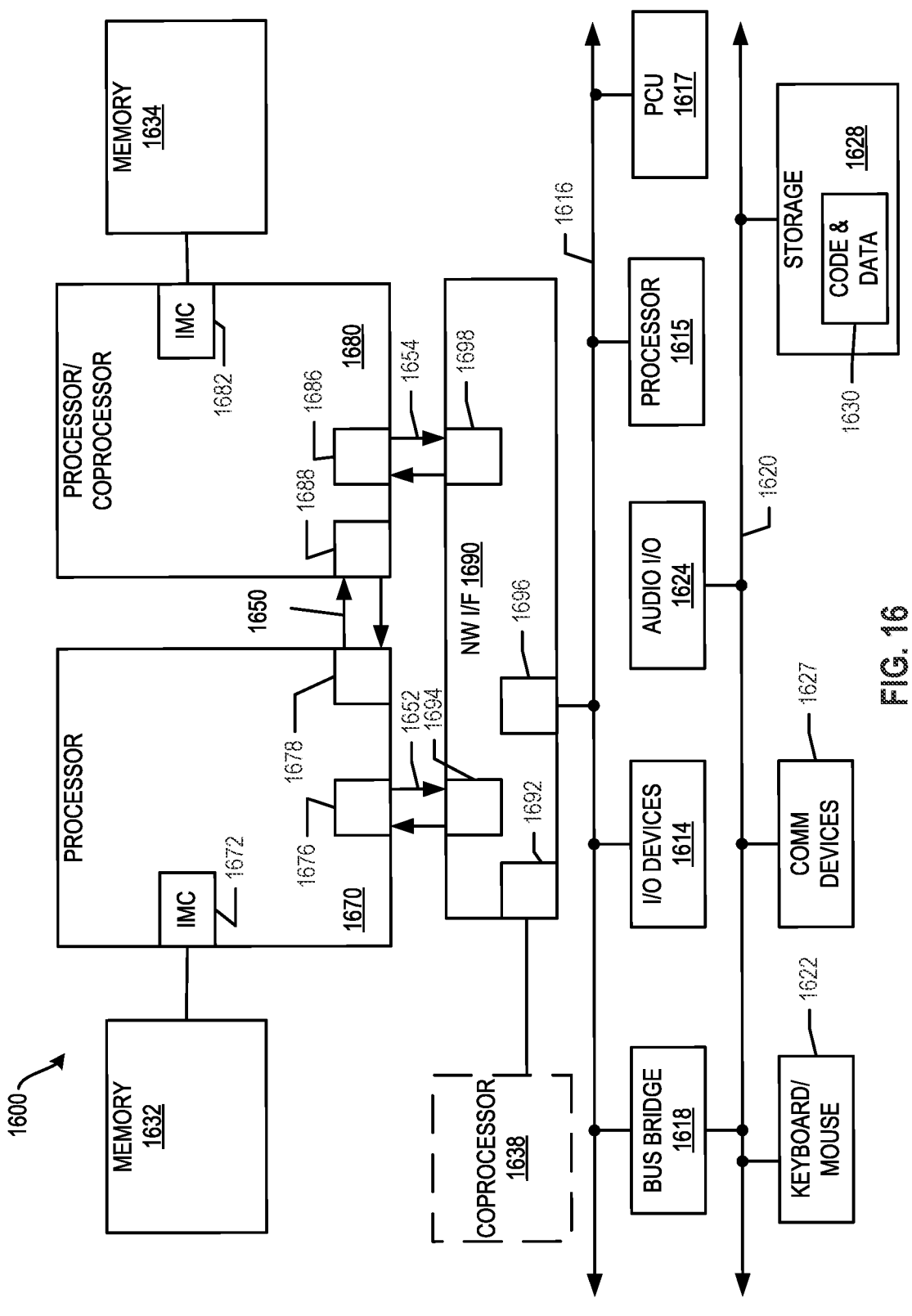
FIG. 16 illustrates an example computing system.

FIG. 16 illustrates an example computing system. Multi-processor system 1600 is an interfaced system and includes a plurality of processors or cores including a first processor 1670 and a second processor 1680 coupled via an interface 1650 such as a point-to-point (P-P) interconnect, a fabric, and/or bus. In some examples, the first processor 1670 and the second processor 1680 are homogeneous. In some examples, first processor 1670 and the second processor 1680 are heterogenous. Though the example system 1600 is shown to have two processors, the system may have three or more processors, or may be a single processor system. In some examples, the computing system is a system on a chip (SoC).

Processors 1670 and 1680 are shown including integrated memory controller (IMC) circuitry 1672 and 1682, respectively. Processor 1670 also includes interface circuits 1676 and 1678; similarly, second processor 1680 includes interface circuits 1686 and 1688. Processors 1670, 1680 may exchange information via the interface 1650 using interface circuits 1678, 1688. IMCs 1672 and 1682 couple the processors 1670, 1680 to respective memories, namely a memory 1632 and a memory 1634, which may be portions of main memory locally attached to the respective processors.

Processors 1670, 1680 may each exchange information with a network interface (NW I/F) 1690 via individual interfaces 1652, 1654 using interface circuits 1676, 1694, 1686, 1698. The network interface 1690 (e.g., one or more of an interconnect, bus, and/or fabric, and in some examples is a chipset) may optionally exchange information with a coprocessor 1638 via an interface circuit 1692. In some examples, the coprocessor 1638 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1670, 1680 or outside of both processors, yet connected with the processors via an interface such as P-P interconnect, such that either or both processors' local cache information may be stored in the shared cache if a processor is placed into a low power mode.

Network interface 1690 may be coupled to a first interface 1616 via interface circuit 1696. In some examples, first interface 1616 may be an interface such as a Peripheral Component Interconnect (PCI) interconnect, a PCI Express interconnect or another IO interconnect. In some examples, first interface 1616 is coupled to a power control unit (PCU) 1617, which may include circuitry, software, and/or firmware to perform power management operations with regard to the processors 1670, 1680 and/or co-processor 1638. PCU 1617 provides control information to a voltage regulator (not shown) to cause the voltage regulator to generate the appropriate regulated voltage. PCU 1617 also provides control information to control the operating voltage generated. In various examples, PCU 1617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1617 is illustrated as being present as logic separate from the processor 1670 and/or processor 1680. In other cases, PCU 1617 may execute on a given one or more of cores (not shown) of processor 1670 or 1680. In some cases, PCU 1617 may be implemented as a microcontroller (dedicated or general-purpose) or other control logic configured to execute its own dedicated power management code, sometimes referred to as P-code. In yet other examples, power management operations to be performed by PCU 1617 may be implemented externally to a processor, such as by way of a separate power management integrated circuit (PMIC) or another component external to the processor. In yet other examples, power management operations to be performed by PCU 1617 may be implemented within BIOS or other system software.

Various IO devices 1614 may be coupled to first interface 1616, along with a bus bridge 1618 which couples first interface 1616 to a second interface 1620. In some examples, one or more additional processor(s) 1615, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1616. In some examples, second interface 1620 may be a low pin count (LPC) interface. Various devices may be coupled to second interface 1620 including, for example, a keyboard and/or mouse 1622, communication devices 1627 and storage circuitry 1628. Storage circuitry 1628 may be one or more non-transitory machine-readable storage media as described below, such as a disk drive or other mass storage device which may include instructions/code and data 1630. Further, an audio IO 1624 may be coupled to second interface 1620. Note that other architectures than the point-to-point architecture described above are possible. For example, instead of the point-to-point architecture, a system such as multiprocessor system 1600 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 17:
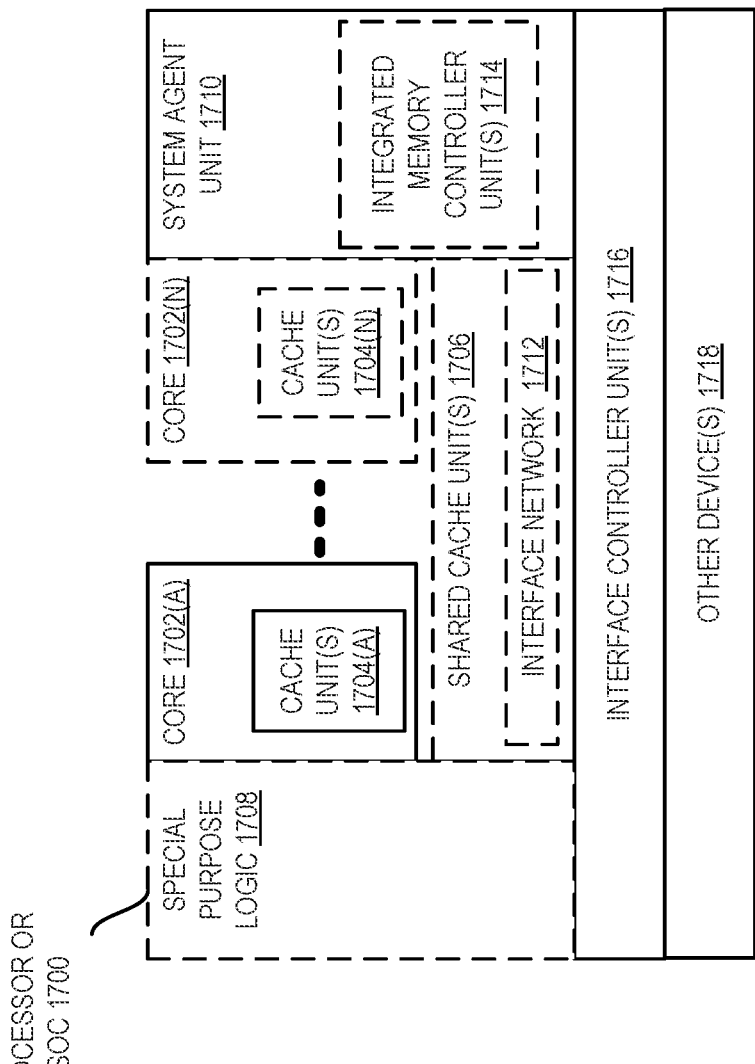
FIG. 17 illustrates a block diagram of an example processor and/or System on a Chip (SoC) that may have one or more cores and an integrated memory controller.

FIG. 17 illustrates a block diagram of an example processor and/or SoC 1700 that may have one or more cores and an integrated memory controller. The solid lined boxes illustrate a processor 1700 with a single core 1702(A), system agent unit circuitry 1710, and a set of one or more interface controller unit(s) circuitry 1716, while the optional addition of the dashed lined boxes illustrates an alternative processor 1700 with multiple cores 1702(A)-(N), a set of one or more integrated memory controller unit(s) circuitry 1714 in the system agent unit circuitry 1710, and special purpose logic 1708, as well as a set of one or more interface controller units circuitry 1716. Note that the processor 1700 may be one of the processors 1670 or 1680, or co-processor 1638 or 1615 of FIG. 16.

Thus, different implementations of the processor 1700 may include: 1) a CPU with the special purpose logic 1708 being integrated graphics and/or scientific (throughput) logic (which may include one or more cores, not shown), and the cores 1702(A)-(N) being one or more general purpose cores (e.g., general purpose in-order cores, general purpose out-of-order cores, or a combination of the two); 2) a coprocessor with the cores 1702(A)-(N) being a large number of special purpose cores intended primarily for graphics and/or scientific (throughput); and 3) a coprocessor with the cores 1702(A)-(N) being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1704(A)-(N) within the cores 1702(A)-(N), a set of one or more shared cache unit(s) circuitry 1706, and external memory (not shown) coupled to the set of integrated memory controller unit(s) circuitry 1714. The set of one or more shared cache unit(s) circuitry 1706 may include one or more mid-level caches, such as level 2 (L2), level 3 (L3), level 4 (L4), or other levels of cache, such as a last level cache (LLC), and/or combinations thereof. While in some examples interface network circuitry 1712 (e.g., a ring interconnect) interfaces the special purpose logic 1708 (e.g., integrated graphics logic), the set of shared cache unit(s) circuitry 1706, and the system agent unit circuitry 1710, alternative examples use any number of well-known techniques for interfacing such units. In some examples, coherency is maintained between one or more of the shared cache unit(s) circuitry 1706 and cores 1702(A)-(N). In some examples, interface controller units circuitry 1716 couple the cores 1702 to one or more other devices 1718 such as one or more IO devices, storage, one or more communication devices (e.g., wireless networking, wired networking, etc.), etc.

In some examples, one or more of the cores 1702(A)-(N) are capable of multi-threading. The system agent unit circuitry 1710 includes those components coordinating and operating cores 1702(A)-(N). The system agent unit circuitry 1710 may include, for example, power control unit (PCU) circuitry and/or display unit circuitry (not shown). The PCU may be or may include logic and components needed for regulating the power state of the cores 1702(A)-(N) and/or the special purpose logic 1708 (e.g., integrated graphics logic). The display unit circuitry is for driving one or more externally connected displays.

The cores 1702(A)-(N) may be homogenous in terms of instruction set architecture (ISA). Alternatively, the cores 1702(A)-(N) may be heterogeneous in terms of ISA; that is, a subset of the cores 1702(A)-(N) may be capable of executing an ISA, while other cores may be capable of executing only a subset of that ISA or another ISA.

Example Core Architectures—In-Order and Out-of-Order Core Block Diagram.

Figure 18A:
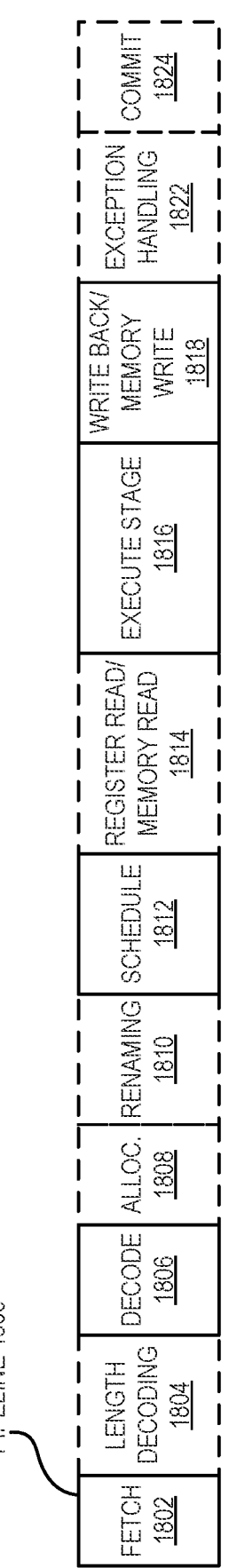
FIG. 18A is a block diagram illustrating both an example in-order pipeline and an example register renaming, out-of-order issue/execution pipeline according to examples.
Figure 18B:
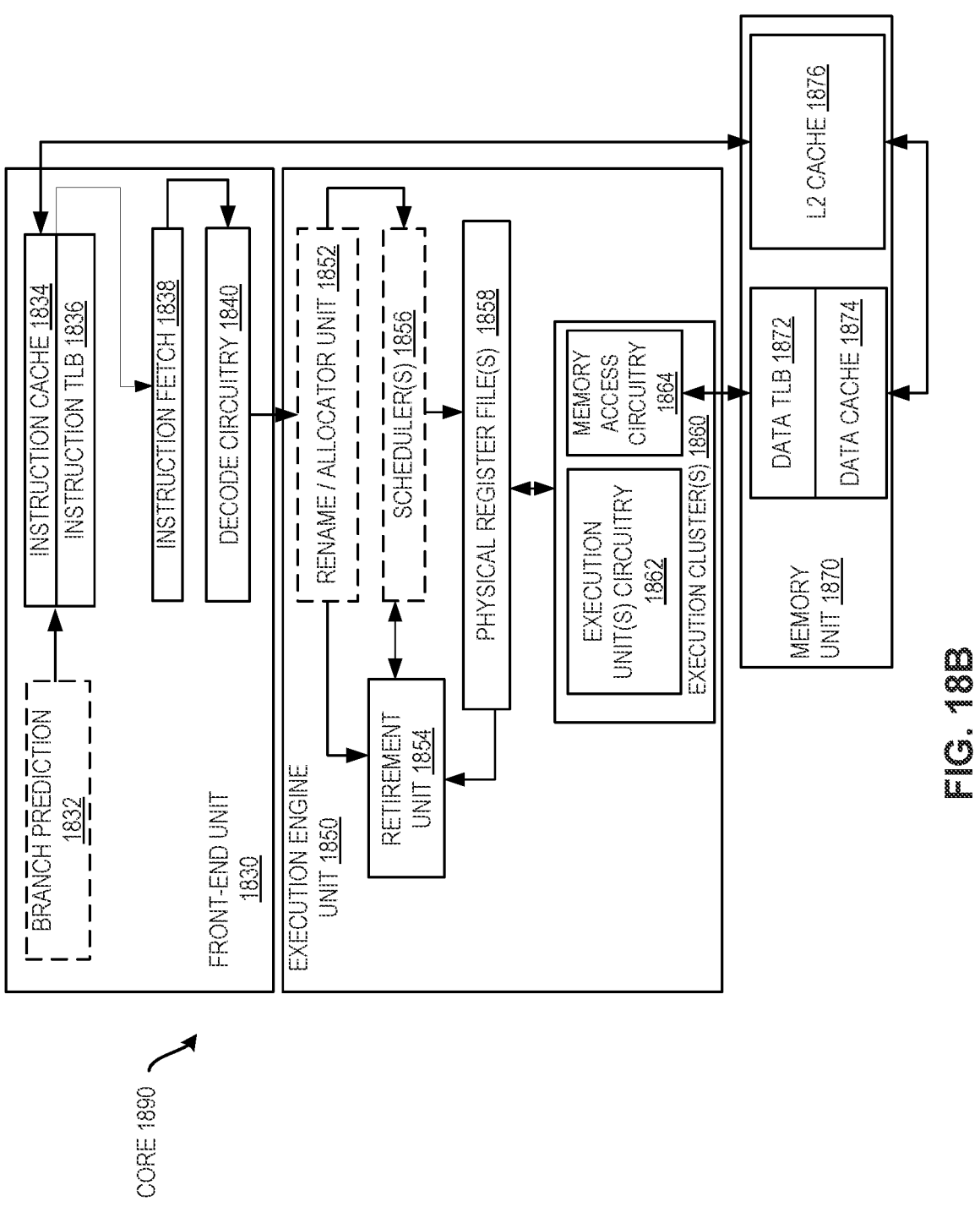
FIG. 18B is a block diagram illustrating both an example in-order architecture core and an example register renaming, out-of-order issue/execution architecture core to be included in a processor according to examples.

FIG. 18A is a block diagram illustrating both an example in-order pipeline and an example register renaming, out-of-order issue/execution pipeline according to examples. FIG. 18B is a block diagram illustrating both an example in-order architecture core and an example register renaming, out-of-order issue/execution architecture core to be included in a processor according to examples. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, an optional length decoding stage 1804, a decode stage 1806, an optional allocation (Alloc) stage 1808, an optional renaming stage 1810, a schedule (also known as a dispatch or issue) stage 1812, an optional register read/memory read stage 1814, an execute stage 1816, a write back/memory write stage 1818, an optional exception handling stage 1822, and an optional commit stage 1824. One or more operations can be performed in each of these processor pipeline stages. For example, during the fetch stage 1802, one or more instructions are fetched from instruction memory, and during the decode stage 1806, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1806 and the register read/memory read stage 1814 may be combined into one pipeline stage. In one example, during the execute stage 1816, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 18B may implement the pipeline 1800 as follows: 1) the instruction fetch circuitry 1838 performs the fetch and length decoding stages 1802 and 1804; 2) the decode circuitry 1840 performs the decode stage 1806; 3) the rename/allocator unit circuitry 1852 performs the allocation stage 1808 and renaming stage 1810; 4) the scheduler(s) circuitry 1856 performs the schedule stage 1812; 5) the physical register file(s) circuitry 1858 and the memory unit circuitry 1870 perform the register read/memory read stage 1814; the execution cluster(s) 1860 perform the execute stage 1816; 15) the memory unit circuitry 1870 and the physical register file(s) circuitry 1858 perform the write back/memory write stage 1818; 7) various circuitry may be involved in the exception handling stage 1822; and 8) the retirement unit circuitry 1854 and the physical register file(s) circuitry 1858 perform the commit stage 1824.

FIG. 18B shows a processor core 1890 including front-end unit circuitry 1830 coupled to execution engine unit circuitry 1850, and both are coupled to memory unit circuitry 1870. The core 1890 may be a reduced instruction set architecture computing (RISC) core, a complex instruction set architecture computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front-end unit circuitry 1830 may include branch prediction circuitry 1832 coupled to instruction cache circuitry 1834, which is coupled to an instruction translation lookaside buffer (TLB) 1836, which is coupled to instruction fetch circuitry 1838, which is coupled to decode circuitry 1840. In one example, the instruction cache circuitry 1834 is included in the memory unit circuitry 1870 rather than the front-end circuitry 1830. The decode circuitry 1840 (or decoder) may decode instructions, and generate as an output one or more micro-operations, microcode entry points, microinstructions, other instructions, or other control signals, which are decoded from, or which otherwise reflect, or are derived from, the original instructions. The decode circuitry 1840 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1840 may be implemented using various different mechanisms. Examples of suitable mechanisms include, but are not limited to, look-up tables, hardware implementations, programmable logic arrays (PLAs), microcode read only memories (ROMs), etc. In one example, the core 1890 includes a microcode ROM (not shown) or other medium that stores microcode for certain macroinstructions (e.g., in decode circuitry 1840 or otherwise within the front-end circuitry 1830). In one example, the decode circuitry 1840 includes a micro-operation (micro-op) or operation cache (not shown) to hold/cache decoded operations, micro-tags, or micro-operations generated during the decode or other stages of the processor pipeline 1800. The decode circuitry 1840 may be coupled to rename/allocator unit circuitry 1852 in the execution engine circuitry 1850.

The execution engine circuitry 1850 includes the rename/allocator unit circuitry 1852 coupled to retirement unit circuitry 1854 and a set of one or more scheduler(s) circuitry 1856. The scheduler(s) circuitry 1856 represents any number of different schedulers, including reservations stations, central instruction window, etc. In some examples, the scheduler(s) circuitry 1856 can include arithmetic logic unit (ALU) scheduler/scheduling circuitry, ALU queues, address generation unit (AGU) scheduler/scheduling circuitry, AGU queues, etc. The scheduler(s) circuitry 1856 is coupled to the physical register file(s) circuitry 1858. Each of the physical register file(s) circuitry 1858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1858 includes vector registers unit circuitry, writemask registers unit circuitry, and scalar register unit circuitry. These register units may provide architectural vector registers, vector mask registers, general-purpose registers, etc. The physical register file(s) circuitry 1858 is coupled to the retirement unit circuitry 1854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1854 and the physical register file(s) circuitry 1858 are coupled to the execution cluster(s) 1860. The execution cluster(s) 1860 includes a set of one or more execution unit(s) circuitry 1862 and a set of one or more memory access circuitry 1864. The execution unit(s) circuitry 1862 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1856, physical register file(s) circuitry 1858, and execution cluster(s) 1860 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1864). It should also be understood that where separate pipelines are used, one or more of these pipelines may be out-of-order issue/execution and the rest in-order.

In some examples, the execution engine unit circuitry 1850 may perform load store unit (LSU) address/data pipelining to an Advanced Microcontroller Bus (AMB) interface (not shown), and address phase and writeback, data phase load, store, and branches.

The set of memory access circuitry 1864 is coupled to the memory unit circuitry 1870, which includes data TLB circuitry 1872 coupled to data cache circuitry 1874 coupled to level 2 (L2) cache circuitry 1876. In one example, the memory access circuitry 1864 may include load unit circuitry, store address unit circuitry, and store data unit circuitry, each of which is coupled to the data TLB circuitry 1872 in the memory unit circuitry 1870. The instruction cache circuitry 1834 is further coupled to the level 2 (L2) cache circuitry 1876 in the memory unit circuitry 1870. In one example, the instruction cache 1834 and the data cache 1874 are combined into a single instruction and data cache (not shown) in L2 cache circuitry 1876, level 3 (L3) cache circuitry (not shown), and/or main memory. The L2 cache circuitry 1876 is coupled to one or more other levels of cache and eventually to a main memory.

The core 1890 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1890 includes logic to support a packed data instruction set architecture extension (e.g., AVX1, AVX2), thereby allowing the operations used by many multimedia applications to be performed using packed data.

Example Execution Unit(s) Circuitry.

Figure 19:
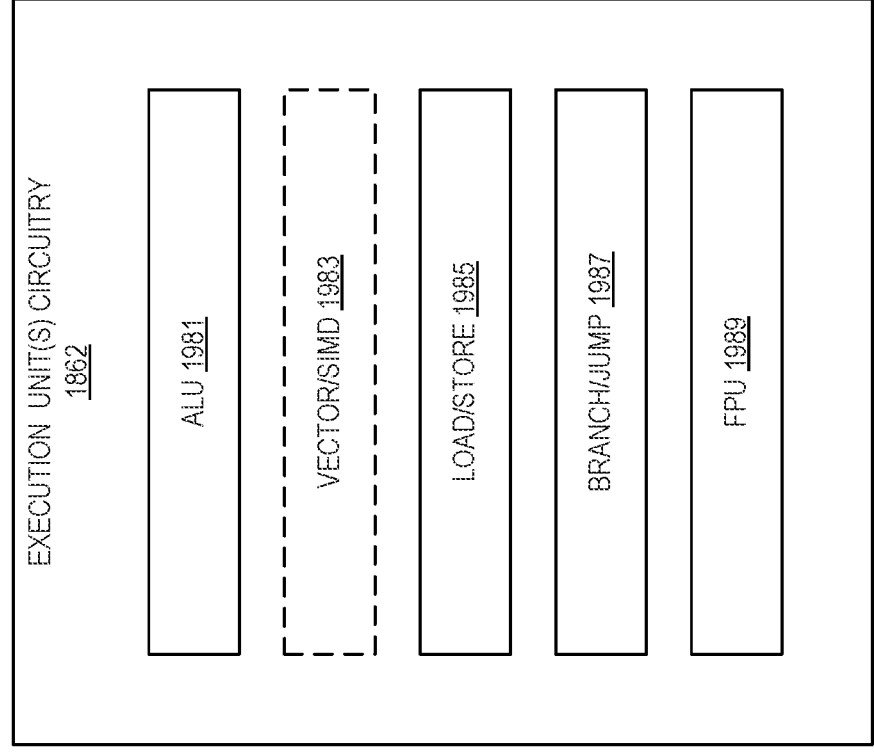
FIG. 19 illustrates examples of execution unit(s) circuitry.

FIG. 19 illustrates examples of execution unit(s) circuitry, such as execution unit(s) circuitry 1862 of FIG. 18B. As illustrated, execution unit(s) circuitry 1862 may include one or more ALU circuits 1981, optional vector/single instruction multiple data (SIMD) circuits 1983, load/store circuits 1985, branch/jump circuits 1987, and/or Floating-point unit (FPU) circuits 1989. ALU circuits 1981 perform integer arithmetic and/or Boolean operations. Vector/SIMD circuits 1983 perform vector/SIMD operations on packed data (such as SIMD/vector registers). Load/store circuits 1985 execute load and store instructions to load data from memory into registers or store from registers to memory. Load/store circuits 1985 may also generate addresses. Branch/jump circuits 1987 cause a branch or jump to a memory address depending on the instruction. FPU circuits 1989 perform floating-point arithmetic. The width of the execution unit(s) circuitry 1862 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

FIG. 20 is a block diagram of a register architecture 2000 according to some examples. As illustrated, the register architecture 2000 includes vector/SIMD registers 2010 that vary from 128-bit to 1,024 bits width. In some examples, the vector/SIMD registers 2010 are physically 512-bits and, depending upon the mapping, only some of the lower bits are used. For example, in some examples, the vector/SIMD registers 2010 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 2000 includes writemask/predicate registers 2015. For example, in some examples, there are 8 writemask/predicate registers (sometimes called k0 through k7) that are each 16-bit, 32-bit, 154-bit, or 128-bit in size. Writemask/predicate registers 2015 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 2015 corresponds to a data element position of the destination. In other examples, the writemask/predicate registers 2015 are scalable and consists of a set number of enable bits for a given vector element (e.g., 8 enable bits per 154-bit vector element).

The register architecture 2000 includes a plurality of general-purpose registers 2025. These registers may be 16-bit, 32-bit, 154-bit, etc. and can be used for scalar operations. In some examples, these registers are referenced by the names RAX, RBX, RCX, RDX, RBP, RSI, RDI, RSP, and R8 through R15.

In some examples, the register architecture 2000 includes scalar floating-point (FP) register file 2045 which is used for scalar floating-point operations on 32/64/80-bit floating-point data using the x87 instruction set architecture extension or as MMX registers to perform operations on 154-bit packed integer data, as well as to hold operands for some operations performed between the MMX and XMM registers.

One or more flag registers 2040 (e.g., EFLAGS, RFLAGS, etc.) store status and control information for arithmetic, compare, and system operations. For example, the one or more flag registers 2040 may store condition code information such as carry, parity, auxiliary carry, zero, sign, and overflow. In some examples, the one or more flag registers 2040 are called program status and control registers.

Segment registers 2020 contain segment points for use in accessing memory. In some examples, these registers are referenced by the names CS, DS, SS, ES, FS, and GS.

Machine specific registers (MSRs) 2035 control and report on processor performance. Most MSRs 2035 handle system-related functions and are not accessible to an application program. Machine check registers 2060 consist of control, status, and error reporting MSRs that are used to detect and report on hardware errors.

One or more instruction pointer register(s) 2030 store an instruction pointer value. Control register(s) 2055 (e.g., CR0-CR4) determine the operating mode of a processor (e.g., processor 1670, 1680, 1638, 1615, and/or 1700) and the characteristics of a currently executing task. Debug registers 2050 control and allow for the monitoring of a processor or core's debugging operations.

Memory (mem) management registers 2065 specify the locations of data structures used in protected mode memory management. These registers may include a global descriptor table register (GDTR), interrupt descriptor table register (IDTR), task register, and a local descriptor table register (LDTR) register.

MDTI registers 2075 (e.g., which may be MSRs) control and report on multi-level cache data tracking and isolation. In some implementations, the MDTI registers 2075 may include or may extend MSRs utilized in connection with INTEL® RDT, CMP, CAT, and CDP.

Alternative examples may use wider or narrower registers. Additionally, alternative examples may use more, less, or different register files and registers. The register architecture 2000 may, for example, be used in register file/memory, or physical register file(s) circuitry 1858.
Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 21 shows a program in a high-level language 2102 may be compiled using a first ISA compiler 2104 to generate first ISA binary code 2106 that may be natively executed by a processor with at least one first ISA core 2116. The processor with at least one first ISA core 2116 represents any processor that can perform substantially the same functions as an Intel® processor with at least one first ISA core by compatibly executing or otherwise processing (1) a substantial portion of the first ISA or (2) object code versions of applications or other software targeted to run on an Intel® processor with at least one first ISA core, in order to achieve substantially the same result as a processor with at least one first ISA core. The first ISA compiler 2104 represents a compiler that is operable to generate first ISA binary code 2106 (e.g., object code) that can, with or without additional linkage processing, be executed on the processor with at least one first ISA core 2116. Similarly, FIG. 21 shows the program in the high-level language 2102 may be compiled using an alternative ISA compiler 2108 to generate alternative ISA binary code 2110 that may be natively executed by a processor without a first ISA core 2114. The instruction converter 2112 is used to convert the first ISA binary code 2106 into code that may be natively executed by the processor without a first ISA core 2114. This converted code is not necessarily to be the same as the alternative ISA binary code 2110; however, the converted code will accomplish the general operation and be made up of instructions from the alternative ISA. Thus, the instruction converter 2112 represents software, firmware, hardware, or a combination thereof that, through emulation, simulation or any other process, allows a processor or other electronic device that does not have a first ISA processor or core to execute the first ISA binary code 2106.

Techniques and architectures for multi-level cache data tracking and isolation are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

ADDITIONAL NOTES AND EXAMPLES

Example 1 includes an integrated circuit, comprising a first cache organized as two or more ways, a second cache, and circuitry coupled to the first cache and the second cache to determine a designated way allocation for data transferred from the first cache to the second cache, and track the designated way allocation for the data transferred from the first cache to the second cache.

Example 2 includes the integrated circuit of Example 1, wherein the circuitry is further to isolate input/output (IO) data from non-IO data (e.g. core data) for data transferred from the second cache to the first cache based at least in part on the tracked designated way allocation.

Example 3 includes the integrated circuit of any of Examples 1 to 2, wherein the circuitry is further to determine the designated way allocation based on whether the data transferred from the first cache to the second cache comes from one or more ways of the first cache that are designated to be allocated for IO data.

Example 4 includes the integrated circuit of any of Examples 1 to 3, wherein the circuitry is further to evict data from the second cache to the first cache to one or more ways of the first cache indicated by the tracked designated way allocation for the evicted data.

Example 5 includes the integrated circuit of any of Examples 1 to 4, wherein the circuitry is further to store information associated with the second cache that indicates the designated way allocation for an entry of the second cache.

Example 6 includes the integrated circuit of Example 5, wherein an entry in the second cache includes a way allocation field to store the designated way allocation for the entry.

Example 7 includes the integrated circuit of Example 6, wherein the way allocation field comprises a single bit that indicates whether the designated way allocation for the entry corresponds to IO data or non-IO data (e.g. core data).

Example 8 includes the integrated circuit of any of Examples 1 to 7, wherein the second cache is organized as two or more ways, wherein the circuitry is further to designate one or more ways of the second cache to be allocated to store IO data, and store data from the first cache in the designated one or more ways of the second cache based at least in part on the determined designated way allocation for the data from the first cache.

Example 9 includes the integrated circuit of any of Examples 1 to 8, further comprising a third cache coupled to the circuitry, wherein the circuitry is further to track the designated way allocation for data transferred from the second cache to the third cache.

Example 10 includes the integrated circuit of Example 9, wherein the third cache comprises an internal core level-one (L1) cache, wherein the second cache comprises an internal core level-two (L2) cache, and wherein the first cache comprises a last-level cache (LLC).

Example 11 includes a method, comprising determining a designated way allocation for data transferred from a first cache to a second cache, and tracking the designated way allocation for the data transferred from the first cache to the second cache.

Example 12 includes the method of Example 11, further comprising isolating input/output (IO) data from non-IO data (e.g. core data) for data transferred from the second cache to the first cache based at least in part on the tracked designated way allocation.

Example 13 includes the method of any of Examples 11 to 12, further comprising determining the designated way allocation based on whether the data transferred from the first cache to the second cache comes from one or more ways of the first cache that are designated to be allocated for IO data.

Example 14 includes the method of any of Examples 11 to 13, further comprising evicting data from the second cache to the first cache to one or more ways of the first cache indicated by the tracked designated way allocation for the evicted data.

Example 15 includes the method of any of Examples 11 to 14, further comprising storing information associated with the second cache that indicates the designated way allocation for an entry of the second cache.

Example 16 includes the method of Example 15, wherein an entry in the second cache includes a way allocation field to store the designated way allocation for the entry.

Example 17 includes the method of Example 16, wherein the way allocation field comprises a single bit that indicates whether the designated way allocation for the entry corresponds to IO data or non-IO data (e.g. core data).

Example 18 includes the method of any of Examples 11 to 17, wherein the second cache is organized as two or more ways, further comprising designating one or more ways of the second cache to be allocated to store IO data, and storing data from the first cache in the designated one or more ways of the second cache based at least in part on the determined designated way allocation for the data from the first cache.

Example 19 includes the method of any of Examples 11 to 18, further comprising tracking the designated way allocation for data transferred from the second cache to a third cache.

Example 20 includes the method of Example 19, wherein the third cache comprises an internal core level-one (L1) cache, wherein the second cache comprises an internal core level-two (L2) cache, and wherein the first cache comprises a last-level cache (LLC).

Example 21 includes an apparatus, comprising a core that includes a core-level cache, a next-level cache organized as two or more ways, and circuitry coupled to the core-level cache and the next-level cache to determine a designated way allocation for data transferred from the next-level cache to the core-level cache, and track the designated way allocation for the transferred from the next-level cache to the core-level cache.

Example 22 includes the apparatus of Example 21, wherein the circuitry is further to isolate input/output (IO) data from non-IO data (e.g. core data) for data transferred from the core-level cache to the next-level cache based at least in part on the tracked designated way allocation.

Example 23 includes the apparatus of any of Examples 21 to 22, wherein the circuitry is further to determine the designated way allocation based on whether the data transferred from the next-level cache to the core-level cache comes from one or more ways of the next-level cache that are designated to be allocated for IO data.

Example 24 includes the apparatus of any of Examples 21 to 22, wherein the circuitry is further to evict data from the core-level cache to the next-level cache to one or more ways of the next-level cache indicated by the tracked designated way allocation for the evicted data.

Example 25 includes the apparatus of any of Examples 21 to 23, wherein the circuitry is further to store information associated with the core-level cache that indicates the designated way allocation for an entry of the core-level cache.

Example 26 includes the apparatus of Example 25, wherein an entry in the core-level cache includes a way allocation field to store the designated way allocation for the entry.

Example 27 includes the apparatus of Example 26, wherein the way allocation field comprises a single bit that indicates whether the designated way allocation for the entry corresponds to IO data or non-IO data (e.g. core data).

Example 28 includes the apparatus of any of Examples 21 to 27, wherein the core-level cache is organized as two or more ways, wherein the circuitry is further to designate one or more ways of the core-level cache to be allocated to store IO data, and store data from the next-level cache in the designated one or more ways of the core-level cache based at least in part on the determined designated way allocation for the data from the next-level cache.

Example 29 includes the apparatus of any of Examples 21 to 28, wherein the core-level cache comprises an internal core level-two (L2) cache, further comprising an internal core level-one (L1) cache coupled to the circuitry, wherein the circuitry is further to track the designated way allocation for data transferred from the L2 cache to the L1 cache.

Example 30 includes the apparatus of Example 29, wherein the next-level cache comprises a last-level cache (LLC).

Example 31 includes an apparatus, comprising means for determining a designated way allocation for data transferred from a first cache to a second cache, and means for tracking the designated way allocation for the data transferred from the first cache to the second cache.

Example 32 includes the apparatus of Example 31, further comprising means for isolating input/output (IO) data from non-IO data (e.g. core data) for data transferred from the second cache to the first cache based at least in part on the tracked designated way allocation.

Example 33 includes the apparatus of any of Examples 31 to 32, further comprising means for determining the designated way allocation based on whether the data transferred from the first cache to the second cache comes from one or more ways of the first cache that are designated to be allocated for IO data.

Example 34 includes the apparatus of any of Examples 31 to 33, further comprising means for evicting data from the second cache to the first cache to one or more ways of the first cache indicated by the tracked designated way allocation for the evicted data.

Example 35 includes the apparatus of any of Examples 31 to 34, further comprising means for storing information associated with the second cache that indicates the designated way allocation for an entry of the second cache.

Example 36 includes the apparatus of Example 35, wherein an entry in the second cache includes a way allocation field to store the designated way allocation for the entry.

Example 37 includes the apparatus of Example 36, wherein the way allocation field comprises a single bit that indicates whether the designated way allocation for the entry corresponds to IO data or non-IO data (e.g. core data).

Example 38 includes the apparatus of any of Examples 31 to 37, wherein the second cache is organized as two or more ways, further comprising means for designating one or more ways of the second cache to be allocated to store IO data, and means for storing data from the first cache in the designated one or more ways of the second cache based at least in part on the determined designated way allocation for the data from the first cache.

Example 39 includes the apparatus of any of Examples 31 to 38, further comprising means for tracking the designated way allocation for data transferred from the second cache to a third cache.

Example 40 includes the apparatus of Example 39, wherein the third cache comprises an internal core level-one (L1) cache, wherein the second cache comprises an internal core level-two (L2) cache, and wherein the first cache comprises a last-level cache (LLC).

Example 41 includes at least one non-transitory one machine readable medium comprising a plurality of instructions that, in response to being executed on a computing device, cause the computing device to determine a designated way allocation for data transferred from a first cache to a second cache, and track the designated way allocation for the data transferred from the first cache to the second cache.

Example 42 includes the at least one non-transitory one machine readable medium of Example 41, comprising a plurality of further instructions that, in response to being executed on the computing device, cause the computing device to isolate input/output (IO) data from non-IO data (e.g. core data) for data transferred from the second cache to the first cache based at least in part on the tracked designated way allocation.

Example 43 includes the at least one non-transitory one machine readable medium of any of Examples 41 to 42, comprising a plurality of further instructions that, in response to being executed on the computing device, cause the computing device to determine the designated way allocation based on whether the data transferred from the first cache to the second cache comes from one or more ways of the first cache that are designated to be allocated for IO data.

Example 44 includes the at least one non-transitory one machine readable medium of any of Examples 41 to 43, comprising a plurality of further instructions that, in response to being executed on the computing device, cause the computing device to evict data from the second cache to the first cache to one or more ways of the first cache indicated by the tracked designated way allocation for the evicted data.

Example 45 includes the at least one non-transitory one machine readable medium of any of Examples 41 to 44, comprising a plurality of further instructions that, in response to being executed on the computing device, cause the computing device to store information associated with the second cache that indicates the designated way allocation for an entry of the second cache.

Example 46 includes the at least one non-transitory one machine readable medium of Example 45, wherein an entry in the second cache includes a way allocation field to store the designated way allocation for the entry.

Example 47 includes the at least one non-transitory one machine readable medium of Example 46, wherein the way allocation field comprises a single bit that indicates whether the designated way allocation for the entry corresponds to IO data or non-IO data (e.g. core data).

Example 48 includes the at least one non-transitory one machine readable medium of any of Examples 41 to 47, wherein the second cache is organized as two or more ways, comprising a plurality of further instructions that, in response to being executed on the computing device, cause the computing device to designate one or more ways of the second cache to be allocated to store IO data, and store data from the first cache in the designated one or more ways of the second cache based at least in part on the determined designated way allocation for the data from the first cache.

Example 49 includes the at least one non-transitory one machine readable medium of any of Examples 41 to 48, comprising a plurality of further instructions that, in response to being executed on the computing device, cause the computing device to track the designated way allocation for data transferred from the second cache to a third cache.

Example 50 includes the at least one non-transitory one machine readable medium of Example 49, wherein the third cache comprises an internal core level-one (L1) cache, wherein the second cache comprises an internal core level-two (L2) cache, and wherein the first cache comprises a last-level cache (LLC).

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (e.g. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus, comprising:
a first cache comprising first ways and second ways;
a second cache; and
circuitry coupled to the first cache and the second cache, the circuitry to:
identify a first allocation of the first ways to a first data type of multiple data types, wherein the first data type comprises an input/output (IO) data type;
identify a second allocation of the second ways to a second data type of the multiple data types;
detect that a first line is to be fetched from the first cache to a location at the second cache;
where the first line is to be fetched from the first ways, provide a first value, with a bit at the location, to identify the first data type based on the first allocation;
where the first line is to be fetched from the second ways, provide a second value, with the bit at the location, to identify the second data type based on the second allocation;
perform a detection that the first line is to be evicted from the second cache to the first cache;
perform a selection, based on the detection, between the first ways or the second ways based on the bit; and
signal that the first line is to be evicted to a way of the first cache based on the selection.

2. The apparatus of claim 1, wherein:
the first cache is shared by multiple processor cores; and
a processor core of the multiple processor cores comprises the second cache.

3. The apparatus of claim 2, wherein the first cache is a last level cache.

4. The apparatus of claim 1, wherein:
the location and the bit are a first location and a first bit, respectively;
the apparatus further comprises a third cache; and
the circuitry is further to:
detect that the first line is to be fetched from the second cache to a second location at the third cache; and
provide, with a second bit at the second location, one of the first value or the second value based on the first bit.

5. The apparatus of claim 4, wherein the circuitry is further to:
detect that the first line is to be evicted from the third cache to a third location at the second cache; and
provide, with a third bit at the third location, one of the first value of the second value based on the second bit.

6. The apparatus of claim 1, wherein the circuitry is further to perform the first allocation and the second allocation.

7. The apparatus of claim 1, wherein the second data type comprises a core data type.

8. At least one non-transitory machine readable medium comprising a plurality of instructions that, in response to being executed on a computing device, cause the computing device to:

identify a first allocation of first ways to a first data type of multiple data types, wherein the first data type comprises an input/output (IO) data type;

identify a second allocation of second ways to a second data type of the multiple data types, wherein a first cache comprises the first ways and the second ways;

detect that a first line is to be fetched from the first cache to a location at a second cache;

where the first line is to be fetched from the first ways, provide a first value, with a bit at the location, to identify the first data type based on the first allocation;

where the first line is to be fetched from the second ways, provide a second value, with the bit at the location, to identify the second data type based on the second allocation;

performing a detection that the first line is to be evicted from the second cache to the first cache;

performing a selection, based on the detection, between the first ways or the second ways based on the bit; and signaling that the first line is to be evicted to a way of the first cache based on the selection.

9. The at least one non-transitory machine readable medium of claim 8, wherein:

the first cache is shared by multiple processor cores; and a processor core of the multiple processor cores comprises the second cache.

10. The at least one non-transitory machine readable medium of claim 8, wherein:

the location and the bit are a first location and a first bit, respectively; and the at least one non-transitory machine readable medium comprises a plurality of further instructions that, in response to being executed on the computing device, cause the computing device to:

detect that the first line is to be fetched from the second cache to a second location at a third cache; and provide, with a second bit at the second location, one of the first value or the second value based on the first bit.

11. The at least one non-transitory machine readable medium of claim 10, comprising a plurality of further instructions that, in response to being executed on the computing device, cause the computing device to:

detect that the first line is to be evicted from the third cache to a third location at the second cache; and provide, with a third bit at the third location, one of the first value of the second value based on the second bit.

12. The at least one non-transitory machine readable medium of claim 8, wherein the second data type comprises a core data type.

13. An apparatus, comprising:

a core that includes a core-level cache;

a next-level cache comprising first ways and second ways; and circuitry coupled to the core-level cache and the next-level cache, the circuitry to:

identify a first allocation of the first ways to a first data type of multiple data types, wherein the first data type comprises an input/output (IO) data type;

identify a second allocation of the second ways to a second data type of the multiple data types;

detect that a first line is to be fetched from the next-level cache to a location at the core-level cache;

where the first line is to be fetched from the first ways, provide a first value, with a bit at the location, to identify the first data type based on the first allocation;

where the first line is to be fetched from the second ways, provide a second value, with the bit at the location, to identify the second data type based on the second allocation;

perform a detection that the first line is to be evicted from the core-level cache to the next-level cache;

perform a selection, based on the detection, between the first ways or the second ways based on the bit; and signal that the first line is to be evicted to a way of the next-level cache based on the selection.

14. The apparatus of claim 13, wherein the next-level cache is shared by multiple processor cores.

15. The apparatus of claim 14, wherein the next-level cache is a last level cache.

16. The apparatus of claim 13, wherein:

the location and the bit are a first location and a first bit, respectively;

the core-level cache is a first core-level cache;

the location and the bit are a first location and a first bit, respectively;

the core further comprises a second core-level cache; and the circuitry is further to:

detect that the first line is to be fetched from the first core-level cache to a second location at the second core-level cache; and provide, with a second bit at the second location, one of the first value or the second value based on the first bit.

17. The apparatus of claim 16, wherein the circuitry is further to:

detect that the first line is to be evicted from the second core-level cache to a third location at the first core-level cache; and provide, with a third bit at the third location, one of the first value or the second value based on the second bit.

* * * * *